(12) United States Patent
Barbosa

(10) Patent No.: US 10,270,359 B2
(45) Date of Patent: Apr. 23, 2019

(54) MULTI-USE DRIVER CIRCUITS

(71) Applicant: New Energies & Alternative Technologies, Inc., Albuquerque, NM (US)

(72) Inventor: Issac Ananda Barbosa, Albuquerque, NM (US)

(73) Assignee: New Energies & Alternative Technologies, Inc., Albuquerque, NM (US)

( * ) Notice: Subject to any disclaimer, the term of this patent is extended or adjusted under 35 U.S.C. 154(b) by 347 days.

(21) Appl. No.: 15/081,022

(22) Filed: Mar. 25, 2016

(65) Prior Publication Data

US 2017/0279368 A1    Sep. 28, 2017

(51) Int. Cl.
  *H02M 1/32* (2007.01)
  *H02M 7/06* (2006.01)

(52) U.S. Cl.
  CPC ............ *H02M 7/062* (2013.01); *H02M 1/32* (2013.01)

(58) Field of Classification Search
  CPC .......... H02M 7/00–7/19; H02M 1/32; H02M 2001/0009; H02M 1/08; H02M 3/156; H02M 2001/325; H02M 3/33507; G09G 2300/0426; G09G 2310/08; G09G 2330/028; G09G 2330/04; G09G 3/3208; G09G 3/3283
  See application file for complete search history.

(56) References Cited

U.S. PATENT DOCUMENTS

| | | | |
|---|---|---|---|
| 4,379,988 A | 4/1983 | Mattatall | |
| 4,563,629 A | 1/1986 | Keiper | |
| 5,912,568 A | 6/1999 | Kiley | |
| 5,962,979 A * | 10/1999 | Dejonge | H05B 41/28 315/208 |
| 6,411,045 B1 | 6/2002 | Nerone | |
| 6,948,829 B2 | 9/2005 | Verdes | |
| 7,304,872 B1 * | 12/2007 | Yakymyshyn | H02M 5/06 307/140 |

(Continued)

FOREIGN PATENT DOCUMENTS

| WO | WO 02/42682 | 5/2002 |
|---|---|---|
| WO | WO 2008/041587 | 4/2008 |

OTHER PUBLICATIONS

Capacitor, From Wikipedia, the free encyclopedia [online] [retrieved on Mar. 24, 2016]. Retrieved from the Internet:https://en.wikipedia.org/wiki/Capacitor, 25 pages.

(Continued)

*Primary Examiner* — Premal R Patel
(74) *Attorney, Agent, or Firm* — Fish & Richardson P.C.

(57) ABSTRACT

In some implementations, a device that powers a load includes a first terminal to couple with an alternating current (AC) power source, a second terminal to couple with the AC power source, and a full bridge rectifier arranged to receive power from the AC power source and provide direct current (DC) power between a positive node and a negative node. The device includes a first capacitor coupled in series between the full bridge rectifier and the first terminal or the second terminal, a load coupled between the positive node and negative node of the rectifier, and a second capacitor coupled between the positive node and negative node of the rectifier, in parallel with the load.

23 Claims, 14 Drawing Sheets

(56) References Cited

U.S. PATENT DOCUMENTS

| | | | |
|---|---|---|---|
| 8,388,183 B2 | 3/2013 | Miki | |
| 8,408,748 B2 | 4/2013 | Janik | |
| 8,414,153 B2 | 4/2013 | Barta | |
| 9,016,901 B2 | 4/2015 | Janik | |
| 9,267,649 B2 | 2/2016 | Janik | |
| 9,681,504 B1 | 6/2017 | Barbosa | |
| 9,681,511 B1 | 6/2017 | Barbosa | |
| 2002/0191401 A1 | 12/2002 | He | |
| 2006/0076240 A1* | 4/2006 | Neeb | H01M 10/42 205/102 |
| 2007/0103914 A1 | 5/2007 | McCaffrey | |
| 2007/0228999 A1 | 10/2007 | Kit | |
| 2008/0094000 A1* | 4/2008 | Yamamoto | H05B 33/0803 315/250 |
| 2008/0252229 A1 | 10/2008 | Wu | |
| 2010/0277067 A1* | 11/2010 | Maxik | F21V 3/00 315/32 |
| 2010/0277069 A1 | 11/2010 | Janik | |
| 2011/0127913 A1* | 6/2011 | Harmgardt | H05B 33/0803 315/35 |
| 2011/0175537 A1 | 7/2011 | Horng et al. | |
| 2011/0198925 A1 | 8/2011 | Yang | |
| 2011/0227489 A1 | 9/2011 | Huynh | |
| 2011/0285289 A1 | 11/2011 | Tremblay | |
| 2011/0316446 A1 | 12/2011 | Kang | |
| 2012/0007514 A1 | 1/2012 | Lin | |
| 2012/0043892 A1 | 2/2012 | Visser et al. | |
| 2012/0049737 A1 | 3/2012 | Kitagawa | |
| 2012/0069606 A1 | 3/2012 | Sagneri | |
| 2012/0081009 A1 | 4/2012 | Shteynberg et al. | |
| 2012/0194094 A1 | 8/2012 | Hsin-Mao et al. | |
| 2012/0256551 A1 | 10/2012 | Kim et al. | |
| 2013/0020951 A1 | 1/2013 | Pollock et al. | |
| 2013/0063043 A1* | 3/2013 | Daniel | H05B 33/0809 315/294 |
| 2013/0082611 A1 | 4/2013 | Cohen | |
| 2014/0191672 A1 | 7/2014 | Stack | |
| 2014/0232289 A1 | 8/2014 | Brandes | |
| 2014/0265892 A1 | 9/2014 | Chang | |
| 2014/0265903 A1 | 9/2014 | Park et al. | |
| 2015/0054410 A1 | 2/2015 | Sanders | |
| 2015/0062987 A1* | 3/2015 | Chen | H02M 1/32 363/89 |
| 2015/0117076 A1* | 4/2015 | Zhang | H02M 7/219 363/127 |
| 2015/0208476 A1* | 7/2015 | Muramatsu | H05B 33/0815 315/193 |
| 2015/0264766 A1 | 9/2015 | Takatsu | |
| 2015/0312987 A1 | 10/2015 | Gibbs | |
| 2016/0029578 A1 | 2/2016 | Martin et al. | |
| 2016/0192598 A1 | 7/2016 | Haggarty | |
| 2017/0280525 A1 | 9/2017 | Barbosa | |

OTHER PUBLICATIONS

Diode bridge, From Wikipedia, the free encyclopedia [online] [retrieved on Mar. 24, 2016]. Retrieved from the Internet: https://en.wikipedia.org/wiki/Diode_bridge, 6 pages.

Full Wave Rectifier and Bridge Rectifier Theory [online] [retrieved on Mar. 24, 2016]. Retrieved from the Internet: http://www.electronics-tutorials.ws/diode/diode_6.html, 9 pages.

Light-emitting diode, From Wikipedia, the free encyclopedia [online] [retrieved on Feb. 15, 2016]. Retrieved from the Internet: https://en.wikipedia.org/wiki/Lightemitting_diode, 34 pages.

Rectifier, From Wikipedia, the free encyclopedia [online] [retrieved on Mar. 24, 2016]. Retrieved from the Internet: https://en.wikipedia.org/wiki/Rectifier, 18 pages.

Voltage ratings on electrolytic capacitors? [online] [retrieved on Mar. 24, 2016]. Retrieved from the Internet: http://forum.allaboutcircuits.com/threads/voltage-ratings-on-electrolytic-capacitors.47903/, 22 pages.

Nachbaur, Oliver. "White LED Power Supply Design Techniques," Texas Instruments Deutschland GmbH, Copyright 2003, Texas Instruments Incorporated, 8 pages.

Instructables, "Power LED's—simplest light with constant-current circuit" [online] [retrieved on Mar. 21, 2016]. Retrieved from the Internet: http://www.instructables.com/id/Power-LED-s-simplest-light-with-constant-current/, 14 pages.

U.S. Non-Final Office Action for U.S. Appl. No. 15/081,039 dated Jun. 9, 2016, 19 pages.

U.S. Non-Final Office Action for U.S. Appl. No. 15/389,905, dated Jul. 14, 2017, 27 pages.

International Search Report and Written Opinion, in International Application No. PCT/US2017/037065, dated Aug. 16, 2017, 13 pages.

International Search Report and Written Opinion, in International Application No. PCT/US2017/024050, dated Jul. 7, 2017, 15 pages.

U.S. Non-Final Office Action for U.S. Appl. No. 15/181,707, dated Sep. 12, 2016, 15 pages.

U.S. Notice of Allowance for U.S. Appl. No. 15/081,039 dated Feb. 9, 2017, 10 pages.

U.S. Notice of Allowance for U.S. Appl. No. 15/081,039 dated Oct. 7, 2016, 13 pages.

\* cited by examiner

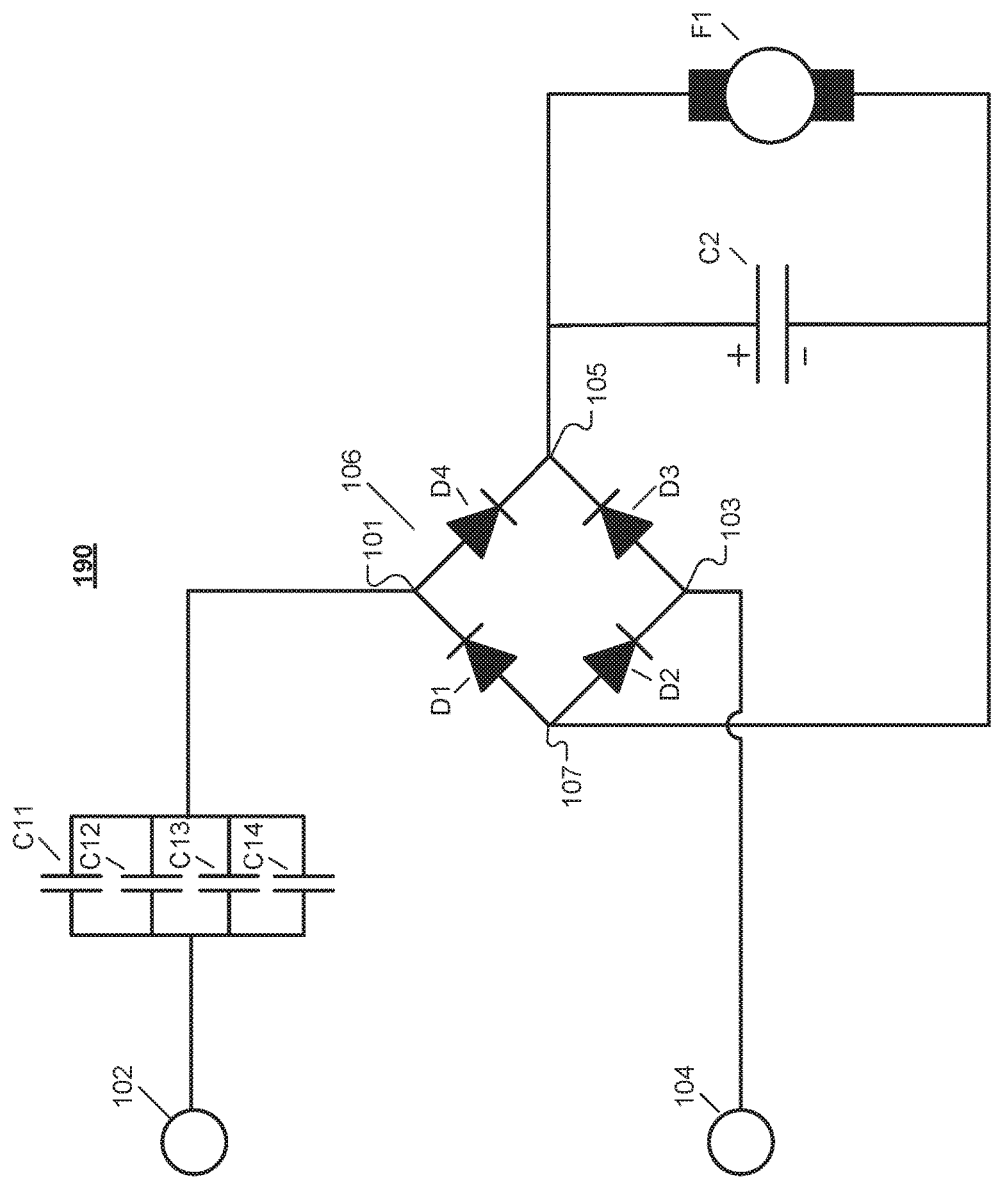

MULTI-USE DRIVER CIRCUITS

BACKGROUND

The present specification relates to power supplies and driver circuits that can supply power to loads, such as motors, light emitting diodes (LEDs), and other devices.

Various types of electrical devices include power supply circuits to provide the power needed for operation. Different electrical devices have different voltage and current needs. Motors, LEDs, and other components may operate using direct current (DC) power, but operating these components from an alternating current (AC) power source may be desirable. LEDs are semiconductor light sources that are used in a variety of applications. LEDs are general more efficient than incandescent or fluorescent bulbs, and different types of LEDs can produce different colors.

SUMMARY

In some implementations, a circuit used to rectify AC input and provide DC power to a load can use the impedance of capacitors to limit overall power consumption of the circuit and improve efficiency. One or more capacitors can be coupled between an AC input and a rectifier to help limit the power drawn by a device. Combined with appropriate loading at the DC output of the rectifier, the circuit can provide DC power to a load with a high efficiency and reduced resistive losses compared to other power supply circuits. Examples of appropriate loads include, for example, a DC motor, a fuel cell, lighting such as incandescent lights or LED lights.

In some implementations, circuits to drive LEDs can provide increased efficiency and lifespan. These circuits can be used in an LED light bulb, such as a replacement for a standard incandescent or fluorescent bulb, and can provide significantly higher efficiency than previous LED light bulbs. Various circuit designs discussed below can use capacitors to avoid unnecessary power dissipation that typically occurs in resistors in LED circuits. Instead of or in addition to using resistors to regulate voltage across LED, the enhanced LED circuits described by this specification use capacitors to bias the LEDs and limit the amount of power dissipated by the circuits, thereby minimizing the amount of energy that is wasted, and reducing heat. As discussed below, capacitors and other circuit elements can be used in an LED circuit to reduce or eliminate the use of resistors, and increase efficiency and longevity as a result.

One or more capacitors can be connected in series on the AC portion of an LED drive circuit. For example, a capacitor can be inserted between the AC input and a rectifier to provide impedance and help limit the amount of power that is dissipated by the rectifier and the remainder of the circuit. Capacitors can be placed between the rectifier and, for example, the live terminal of the AC input or a neutral terminal of the AC input. In some instances, each of the live and neutral connections may connect to a rectifier through a capacitor. The types of capacitors and combinations of capacitors can provide other benefits. For example, multiple capacitors can be used in parallel on the AC portion of the circuit to reduce wear and increase longevity compared to the use of a single capacitor. As another example, multiple capacitors can be used in series to provide greater impedance and provide other benefits. For example, capacitors with different voltage ratings may be used to provide a soft start for the circuit when AC power is first connected.

The capacitors can be arranged to bias LEDs and regulate voltage in a circuit, since the capacitors increase the overall impedance of the circuit and reduce the amount of power passed to other components of the circuit. Arranged in series on the AC portions of the circuit, capacitors can reduce the impact of voltage surges in the circuit by facilitating a delayed release of voltage or soft start. In some implementations, the delayed release lessens the magnitude or rate of voltage surges. Depending on the configuration, some capacitors may be able to operate beyond their rated voltage levels. Arranged in parallel on AC portions of the circuit, multiple capacitors can be used to achieve a desired equivalent series impedance, and can spread heat dissipation among multiple capacitors rather than a single capacitor, which extends operating lifetime of the circuit.

The load on a rectifier can also be designed to provide desired circuit characteristics. Load characteristics of the LEDs can be chosen such that each of the one or more LEDs operate at a voltage less than a maximum voltage rating of each of the LEDs. For example, multiple LEDs can be connected in series so that the voltage drop of the LEDs at full rated power would exceed the peak DC voltage output by the rectifier. Due to the size of the load that the series-connected LEDs represent, the LEDs in this configuration do not reach maximum power dissipation. Instead, the LEDs operate at a lower power level in a more efficient portion of their voltage-current curves. As an example, a 120V (RMS) AC supply may have a peak voltage of about 170V, and a rectifier may provide a rectified output at roughly 170V DC. A series-connected set of LEDs that would drop more than 170V at full rated output can be connected as the load. For example, the series connected set of LEDs may be configured to drop, e.g., 180v, 200V, or 250V, at full output. Connected in this manner, the DC voltage is sufficient to turn on the LEDs so that they produce light, but even the peak DC output will not push the LEDs to operate at maximum rated capacity. As a result, the circuit can limit the LEDs to operation in a more efficient mode than their rated full-power mode of operation. Additionally, the LEDs will operate at a lower temperature, allowing a smaller heatsink or no heatsink in some applications. With lower power operation, the lifespan of the LEDs will often also be increased. Further, since the regulation of current to the LEDs is done through AC capacitors and the LED load characteristics, the circuit avoids wasting power in resistors.

In some implementations, a circuit includes a half-bridge rectifier, e.g., two diodes instead of four in a full bridge rectifier, connected to a live line of the AC power source, and a neutral line of the AC power source is connected between two capacitors. The connection allows the half-bridge rectifier to adequately rectify the AC input to drive LEDs while eliminating the need for a full-bridge rectifier in the circuit. The circuit may use the diode characteristics of the load, e.g., the LEDs, to provide full wave rectification without a full bridge rectifier.

In some implementations, an LED circuit includes multiple full-bridge rectifiers. For example, two or more full-bridge rectifiers can be connected in series, with each providing DC power to a different load, e.g., a different set of LEDs. This configuration can provide increased efficiency and more fine-grained control of light output.

The circuits used to drive LEDs may be used to drive many other different types of loads. For example, LEDs may be replaced with, e.g., other types of lighting, motors, hydrogen fuel cells, or other electrical components.

In one general aspect, a device includes a first terminal to couple to an alternating current (AC) power source; a second terminal to couple to the AC power source; a full bridge rectifier arranged to receive power from the AC source and provide DC power between a positive node and a negative node; a first capacitor coupled in series between the full bridge rectifier and the first terminal or the second terminal; a load coupled between the positive node and negative; and a second capacitor coupled between the positive node and negative node of the rectifier, in parallel with the load.

This aspect and other aspects of the disclosure can include one or more of the following features. The device can include one or more resistors are coupled in series with the load. The load can include a motor. The load can include a fuel cell. The load can include multiple light emitting diode elements coupled in series between the positive and negative outputs of the rectifier. The device can be a removable light bulb, and wherein the device further comprises a threaded light bulb housing. The device can exclude resistors between the positive and negative node.

The first capacitor can be coupled in series between the first terminal and the full bridge rectifier; wherein the device further includes a third capacitor coupled in series between the full bridge rectifier and the first terminal or second terminal. The third capacitor can be coupled in series with the first capacitor. The device can include a resistor coupled in parallel with the third capacitor. The first capacitor and the second capacitor can have different maximum voltage ratings, the capacitors of different maximum voltage ratings regulating a turn on time of the device.

The device can be configured to operate using a 120V AC power source, wherein both the first capacitor and the second capacitor have a maximum voltage rating that exceeds the peak voltage of the 120V AC power source; and wherein the first capacitor and the second capacitor have a difference in maximum voltage rating such that one of the capacitors has a maximum voltage rating at least twice the maximum voltage rating of the other capacitor.

The device can include one or more additional capacitors in parallel with the first capacitor. The device can include one or more additional capacitors in parallel with the second capacitor. The device can include a resistor in parallel with the second capacitor. The device can be configured to operate using an AC power source having a particular voltage, wherein the load is configured to operate at full rated output at a first voltage across the load, and wherein the first voltage is greater than a peak output voltage of the rectifier when the device is coupled to the AC power source of the particular voltage. The load can be configured to place an electrical load on the full bridge rectifier that exceeds the DC output of the rectifier.

In another general aspect, a method for efficiently powering a load includes receiving alternating current (AC) power in a driver circuit; providing the AC power to a full bridge rectifier through one or more capacitors coupled in series between the AC power source and the full bridge rectifier to limit an amount of power drawn by the driver circuit; performing full wave rectification of the AC power using the full bridge rectifier; and applying the rectified output of the full bridge rectifier across a load coupled to the driver circuit.

This aspect and other aspects of the disclosure can include one or more of the following features. Applying the rectified output across the load can include applying the rectified output across a load that includes a light emitting diode (LED), a motor, or a hydrogen fuel cell. Providing the AC power to the full bridge rectifier through one or more capacitors can include providing the AC power to the full bridge rectifier through at least two capacitors to spread heat generation through the driver circuit, each of the at least two capacitors being coupled in series between the AC power source and the full bridge rectifier, and each of the least two capacitors being coupled in parallel with each other. The method can include gradually discharging at least a first capacitor of the one or more capacitors with a resistor providing a discharge path across the first capacitor to limit a risk of shock to a user handling the driver circuit. The method can include providing a soft start response to the application of the AC power in the response of two capacitors arranged in series between the AC power source and the full bridge rectifier, the two capacitors having different voltage ratings.

In another general aspect, a circuit includes one or more LEDs receiving DC power; and one or more capacitors, coupled to the one or more LEDs, that bias the one or more LEDS, such that the circuit regulates the power delivered to the LEDs without the use of resistors. The circuit can include a full-bridge rectifier receiving AC power from an AC source having a live terminal and a neutral terminal, coupled to the one or more capacitors, and providing the DC power to the one or more LEDs. The circuit can include a second full-bridge rectifier coupled to the full-bridge rectifier in series. The circuit can include one or more capacitors coupled in series with the live terminal of the AC source. The circuit can include one or more capacitors coupled in series with the neutral terminal of the AC source. The one or more capacitors can include at least two capacitors.

The circuit can include a half-bridge rectifier receiving AC power from an AC power source having a live terminal and a neutral terminal and coupled to the at least two capacitors, wherein the neutral terminal of the AC power source is coupled to a node between two of the at least two capacitors arranged in series such that the half-bridge rectifier and the at least two capacitors provide the DC power to the one or more LEDs. The one or more LEDs can be in the form of an LED chip. The circuit can include a DC power source. The at least two capacitors can be polarized capacitors. The circuit can include one or more capacitors coupled in series with the live terminal of the AC source. The circuit can include one or more capacitors coupled in series with the neutral terminal of the AC source. Load characteristics of the one or more LEDs can be chosen such that each of the one or more LEDs operate at a voltage having a ratio of less than 1 relative to a maximum voltage rating of each of the one or more LEDs.

In another general aspect, a circuit includes one or more LEDs receiving DC power; and one or more capacitors, coupled to the one or more LEDs, that bias the one or more LEDS. The circuit can include one or more resistors coupled to the one or more capacitors. The circuit can include a full-bridge rectifier receiving AC power from an AC source having a live terminal and a neutral terminal, coupled to the one or more capacitors, and providing the DC power to the one or more LEDs. The one or more capacitors can be at least two capacitors. The circuit can include a half-bridge rectifier receiving AC power from an AC power source having a live terminal and a neutral terminal and coupled to the at least two capacitors, wherein the neutral terminal of the AC power source is coupled to a node between two of the at least two capacitors arranged in series such that the half-bridge rectifier and the at least two capacitors provide the DC power to the one or more LEDs.

Load characteristics of the one or more LEDs can be chosen such that each of the one or more LEDs operate at a voltage having a ratio of less than 1 relative to a maximum voltage rating of each of the one or more LEDs. The circuit can include one or more capacitors coupled in series with one of: the live terminal of the AC source and the neutral terminal of the AC source.

In another general aspect, a device includes: a first terminal to couple with an alternating current (AC) power source; a second terminal to couple with the AC power source; a first diode and a second diode that are coupled in series, the first terminal being coupled to a node between the first diode and the second diode; a first capacitor and a second capacitor that are coupled in series, the second terminal being coupled to a node between the first capacitor and the second capacitor; and one or more light emitting diode elements coupled in parallel with the first capacitor and the second capacitor.

This aspect and other aspects of the disclosure can include one or more of the following features. For example, the device includes a third capacitor that is coupled in series between (i) the first terminal and the node between the first diode and the second diode, or (ii) the second terminal and the node between the first capacitor and the second capacitor. The device includes one or more additional capacitors coupled in parallel with the third capacitor. The device is configured to perform full-wave rectification of voltage from the AC power source without a transformer or full-bridge rectifier. The one or more light emitting diode elements comprise a first set of multiple light emitting diode elements that are coupled in series with each other. The device includes a second set of multiple light emitting diode elements, the second set of multiple light emitting diode elements being coupled in parallel with the first set of multiple light emitting diode elements. The device includes one or more resistors in series with the one or more light emitting diode elements, the one or more resistors and the one or more light emitting diode elements being coupled in parallel with the first capacitor and the second capacitor. The device is a light bulb comprising a light bulb housing, wherein the first terminal and the second terminal are electrical contacts at a base of the light bulb housing, and wherein the first diode, the second diode, the first capacitor, the second capacitor, and the one or more light emitting diode elements are housed within the light bulb housing. The light bulb is a removable light bulb, and the base is a threaded light bulb base. The device includes a capacitor or a resistor coupled in parallel across the first capacitor and the second capacitor. The first capacitor and the second capacitor are polarized capacitors. The device does not include any resistors coupled in series with the one or more light emitting diodes. The device is configured to operate using an AC power source having a particular voltage, the one or more light emitting diode elements are configured to operate at full rated output at a first voltage across the one or more light emitting diode elements, and the first voltage is greater than a peak DC output voltage across the one or more light emitting diode elements when the device is coupled to the AC power source of the particular voltage. The device may include multiple capacitors connected in series with each other, the multiple series-connected being connected in series with the first terminal or the second terminal, the first capacitor and the second capacitor having different maximum voltage ratings to regulate a turn on time of the device.

In another general aspect, a device includes a first terminal to couple with an active line of an alternating current (AC) power source; a second terminal to couple with a neutral line of the AC power source; a first diode and a second diode that are coupled in series, the first terminal being coupled to a node between the first diode and the second diode; a first capacitor and a second capacitor that are coupled in series, the second terminal being coupled to a node between the first capacitor and the second capacitor; and a load comprising a first set of light emitting diode elements and a second set of light emitting diode elements, the first set of light emitting diode elements and the second set of light emitting diode elements being coupled in parallel with each other and with the first capacitor and the second capacitor. The device is configured to provide full wave rectification of alternating current from the alternating current power source using the first diode, the second diode, the first capacitor, the second capacitor, and the load, and wherein the device is configured to apply the full-wave-rectified output across the load. In some implementations, the device is a light bulb comprising a light bulb housing, wherein the first terminal and the second terminal are electrical contacts at a base of the light bulb housing, and wherein the first diode, the second diode, the first capacitor, the second capacitor, and the one or more light emitting diode elements are housed within the light bulb housing.

In another general aspect, a method includes: receiving alternating current input in a driver circuit coupled to one or more light emitting diode elements; performing full-wave rectification of the alternating current input by the driver circuit without using a transformer, inductors, or a full bridge rectifier, the driver circuit using capacitors, two diodes, and the one or more light emitting diode elements to perform the full-wave rectification; and applying the full-wave rectified output across the one or more light emitting diode elements.

This aspect and other aspects can include one or more of the following features: For example, the method may include providing the AC input to a node between the two diodes through one or more capacitors coupled in series between the source of the AC input and the node to limit an amount of power drawn by the driver circuit. Applying the full-wave rectified output across the one or more light emitting diode elements may include applying the full-wave rectified output across multiple sets of series-connected light emitting diode elements, the multiple sets of series-connected light emitting diode elements being arranged in parallel with each other. Receiving the AC input includes: receiving the AC input with a first line of the AC input coupled to a node between the two diodes, the two diodes being coupled in series; and receiving the AC input with a second line of the AC input coupled to a node between two series-connected capacitors, the series-connected capacitors being coupled in parallel with the two diodes.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 1A-1D are diagrams of example circuits that can efficiently drive loads.

Like reference numbers and designations in the various drawings indicate like elements.

DETAILED DESCRIPTION

Figure 1A:
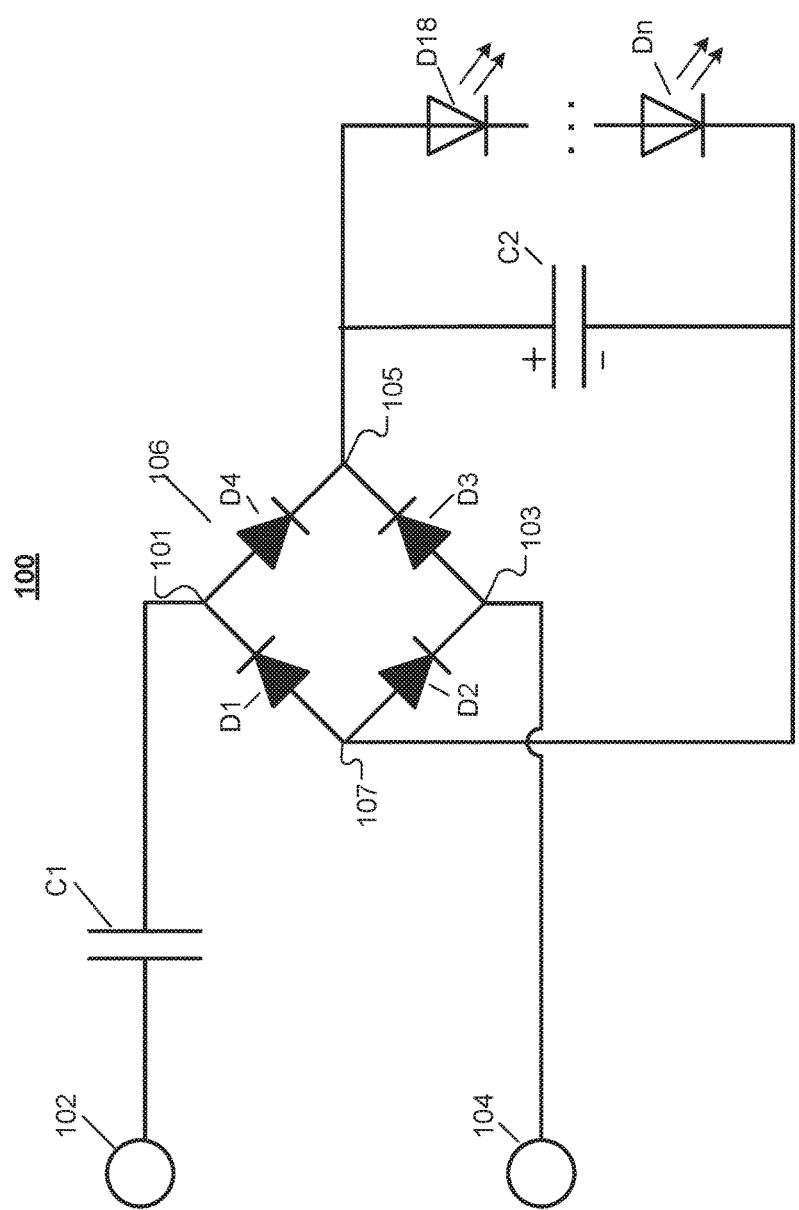

FIG. 1A is a diagram of an example circuit 100 that can efficiently drive loads. In this example, the circuit 100 is a circuit arranged to efficiently power LEDs. The circuit 100 is configured to turn on one or more LEDs to produce light, without the use of resistors to regulate voltage or current provided to the LEDs. The example circuit 100 includes live and neutral terminals of an alternating current (AC) power source, diodes, a full-bridge rectifier, and capacitors. While the circuit 100 is illustrated and described as providing DC power to a load including LEDs, the circuit 100 may be used to provide power to other loads in addition to or instead of LEDs.

The example circuit 100 includes a live terminal 102 and a neutral terminal 104 to couple with an AC power source. These terminals may be connected to, for example, a screw-type base of a light bulb that is configured to be inserted into a standard Edison-type light bulb socket. Examples of AC power sources include, for example, 110V-120V (RMS) power or 220V-240V (RMS) power.

The circuit 100 includes a full wave rectifier that provides DC output during both halves of the AC power cycle. For example, the circuit 100 includes full-bridge rectifier 106 that rectifies the power of the AC power source and provides direct current (DC) power to components after the full-bridge rectifier 106 of the circuit 100. The full-bridge rectifier 106 includes diodes D1, D2, D3, and D4. Node 101 between the diodes D1 and D4 and node 103 between the diodes D2 and D3 are AC terminals of the full-bridge rectifier 106. Node 105 between the diodes D3 and D4 is a positive node of the full-bridge rectifier 106, and node 107 between the diodes D1 and D2 is a negative DC terminal of the full-bridge rectifier 106.

The circuit 100 includes at least one capacitor C1 connected in series between the live terminal 102 and an AC terminal, node 101, of the full-bridge rectifier 106. In some implementations, as an alternative, the capacitor C1 is connected in series between the neutral terminal 104 and different AC terminal, node 103, of the full-bridge rectifier 106. In some implementations, a different capacitor is connected between each of the live and neutral terminals and their respective connections to the rectifier 106.

The capacitor C1 helps regulate power in the circuit 100, for example, providing impedance which helps to limit the overall power available to the rest of the circuit 100, which helps to limit the amount of current that can flow through the LEDs. Thus, the AC impedance provided by the capacitor C1 can limit the amount of power that ultimately flows to the LEDs. The capacitor C1 can be selected to have various different capacitance values, depending on the load characteristics and desired output for the circuit 100. For example, the capacitor C1, or an equivalent combination of capacitors used in place of element C1, can have a capacitance of, e.g., 10 pF, 100 pF, 1 nF, 10 nF, 100 nF, 1 μF, 10 μF, etc.

The circuit 100 further includes one or more LEDs, represented in FIG. 1 as diodes D18 through Dn, connected across DC terminals 105, 107 of the full-bridge rectifier 106. The LEDs D18 through Dn can be any appropriate number of diodes. While a single LED may be used as a load in some instances, the circuit 100 will typically include a plurality of series-connected LEDs. For example, 2, 5, 9, 18, 40, 100, etc. or another number of LED elements may be included. The LEDs may be individual LED elements, packaged separately, or may be diode elements combined into an LED chip. For example, a single chip or package may include 10, 20, or 40 LED elements mounted to a substrate such as a circuit board. In some implementations, each of the LEDs D18 through Dn has the substantially the same load characteristics, e.g., turn on voltage, voltage-current response curve, and so on.

The circuit 100 includes at least one capacitor C2. The capacitor C2 is connected between the DC terminals 105, 107 of the full-bridge rectifier 106, in parallel with the LEDs D18 through Dn. The capacitor C2 smoothes out voltage fluctuations at the DC terminals of the full-bridge rectifier 106, for example, reducing the ripple in the DC output. The capacitor C2 can also reduce the impact of power surges across the circuit 100 on the LEDs D18 through Dn.

In some implementations, the capacitor C2 is a polarized capacitor, e.g., an electrolytic. Polarized capacitors may have less leakage current than non-polar capacitors, may be less expensive for a given capacitance, and are appropriate for many DC power applications. Polarized capacitors provide high capacitance in a small footprint.

As shown in FIG. 1A, the circuit 100 does not include a biasing resistor in series with the LEDs D18 to Dn. In fact, the circuit does not include resistors in the AC portion of the circuit or in the DC portion of the circuit. Generally, biasing resistors are used limit the current that flows into a diode, protecting the diode from damage due to excessive current. Nevertheless, in the circuit 100, load selection and the arrangement of capacitors discussed in the present disclosure allow the circuit 100 to operate safely, and limit the maximum current through the LEDs, without the use of resistors.

The circuit 100 operates each of the LEDs D18 through Dn at significantly less than their respective maximum rated output. For example, the circuit 100 may be designed to operate the LEDs at 50%, 25%, 12%, 6% or less of the power level rated for full turn on of the LEDs. For example, a set of LEDs that would normally operate at a combined output of 40 W may be operated at 10 W, 5 W, or less. Operating the LEDs D18 through Dn at less than their maximum rated output reduces the amount of heat generated, and increases the operating lifetime of each of the LEDs D18 through Dn. Additionally, the load provides a buffer to reduce the risk of overcurrent damage to the LEDs. The voltage drop across the LEDs when at full power output is larger than the peak DC output of the rectifier 106 when the circuit is connected to the appropriate AC voltage source.

The circuit 100 restricts the maximum power any single LED can draw. The other LEDs, being connected in series, will drop voltage along the same path, avoiding excessive currents that could damage one of the LEDs D18 through Dn. The LED load of the circuit 100 is selected such that the LEDs D18 through Dn are not at risk of overcurrent damage, even at maximum DC voltage, taking into account the peak AC voltage of the power source.

As an example, a 120V (RMS) AC supply may have a peak voltage of about 170V, and a rectifier may provide a maximum rectified output at roughly 170V DC. A series-connected set of LEDs that would drop more than 170V at full rated output can be connected as the load. For example, the series connected set of LEDs may be configured to drop, e.g., 180v, 200V, or 250V, at full output. If using LED elements that each drop 12V at typical full power operation, a series of 16 LED elements may be used as the load, thus providing a load that would normally drop 192V, and each LED would instead drop about 10.6V in operation instead of the rated 12V. As another example, using LED elements with a full output at 3.5V, a series of about 56 elements may be used as a load, so that each element operates at about 3.0V. As a result, the voltage drop across each LED is limited to less than the voltage that would result in the rated full power dissipation. The load characteristics, along with the capacitive impedance at the AC portion of the circuit, limit the maximum current through the LEDs without resistors to provide appropriate biasing. As illustrated, no resistors are needed in series with the LEDs or in the AC portion of the circuit 100. Of course, the actual component selection and voltages at the output of the rectifier may vary from the simplified example discussed above. For example, in view of the various relationships of the components in the circuit, the DC output between the nodes 105, 107 may be much less than the 170V mentioned above, and the load selection is performed accordingly. Similarly the effect of the load in the entire system may be taken into account to fine-tune the appropriate number of LEDs and types of LEDs, or the characteristics of another type of load, used with the circuit.

Figure 1B:
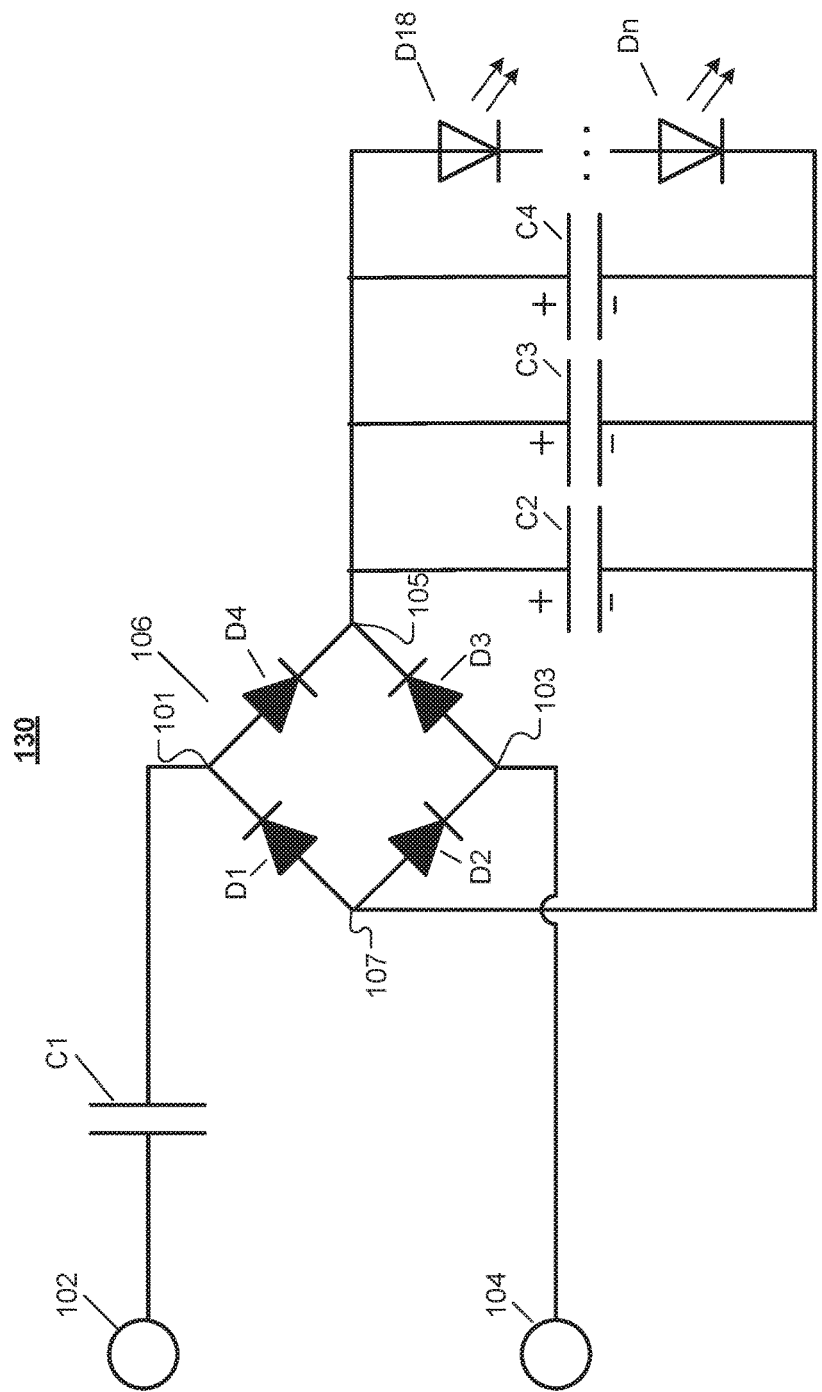

FIG. 1B is a diagram of an example circuit 130 similar to the circuit 100 of FIG. 1A. The circuit 130 is shown to include many of the same components as the circuit 100, each of which functions in the same way as in the circuit 100. The circuit 130 is further shown to include capacitors C3 and C4 connected in parallel with the capacitor C2 and the LEDs D18 through Dn. Using multiple capacitors in parallel can improve the DC voltage filtering ability of the circuit, improve redundancy, and allow a larger overall capacitance. The arrangement of the capacitors C3 and C4 can reduce load and increase lifespan of the capacitor C1. For example, multiple capacitors in parallel, spread charge collection and each heat up less than a single capacitor having a larger capacitance equivalent to the combination of capacitors C1, C3, and C4. The filtering response of multiple individual capacitors may be improved relative to a single capacitor of equivalent capacitance.

Figure 1C:
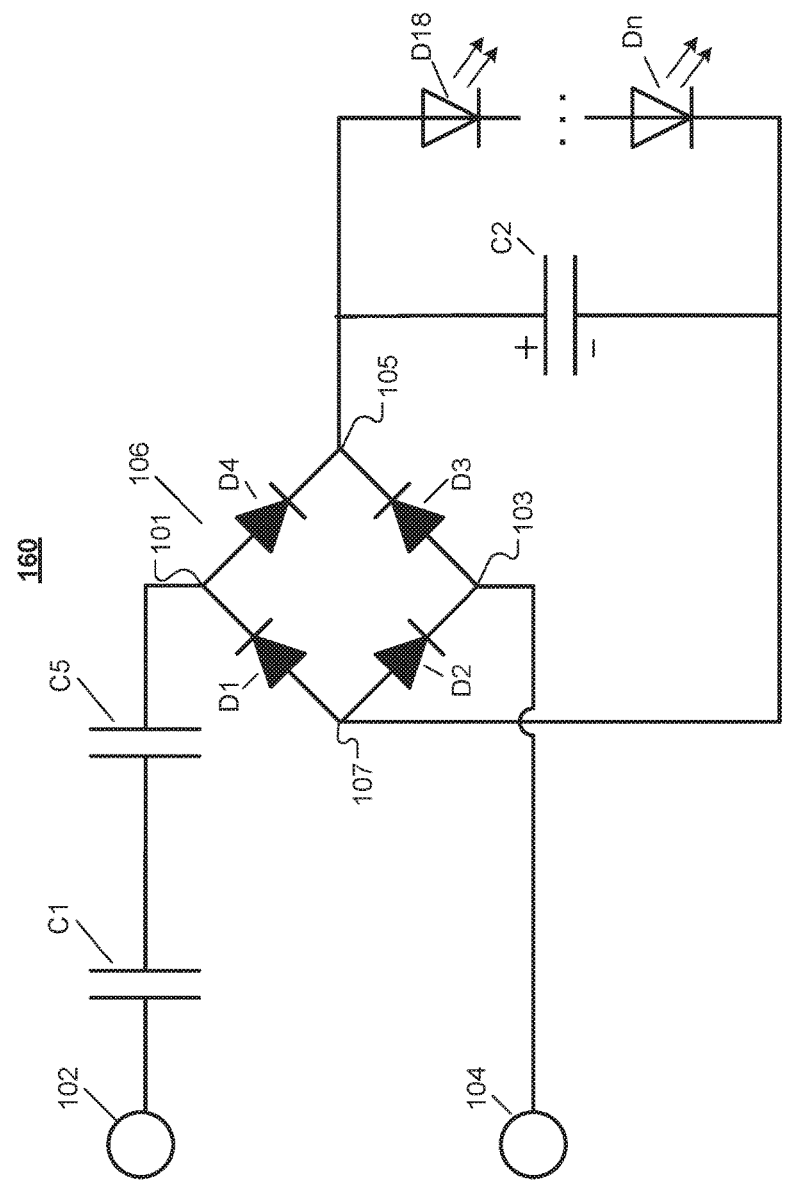

FIG. 1C is a diagram of an example circuit 160 similar to the circuit 100 of FIG. 1A. The circuit 160 is shown to include many of the same components as the circuit 100, each of which functions in the same way as in the circuit 100. The circuit 160 is further shown to include capacitor C5 connected in series with the capacitor C1 and an AC terminal of the full-bridge rectifier 106. The series arrangement of the capacitors C1 and C5 can reduce the impact of voltage surges across the circuit 160. For example, the arrangement can provide a softer start when power is first applied. Capacitors having different voltage ratings and different capacitance values can have different charge collection characteristics. For example, a capacitor constructed and rated to withstand higher voltages may acquire charge more slowly than a capacitor constructed and rated for a lower voltage. A combination of capacitors having different voltage ratings can be used, in series, to limit transient power surges. For example, capacitor C1 may be rated for 200V operation, and C5 may be rated for 400V or 800V operation. In some implementations, the capacitors C1 and C5 may have the same or roughly similar capacitance, e.g., the capacitance of one capacitor is within at least 50% of the capacitance of the other. In other implementations, one capacitor may be much smaller than the other.

Figure 7:
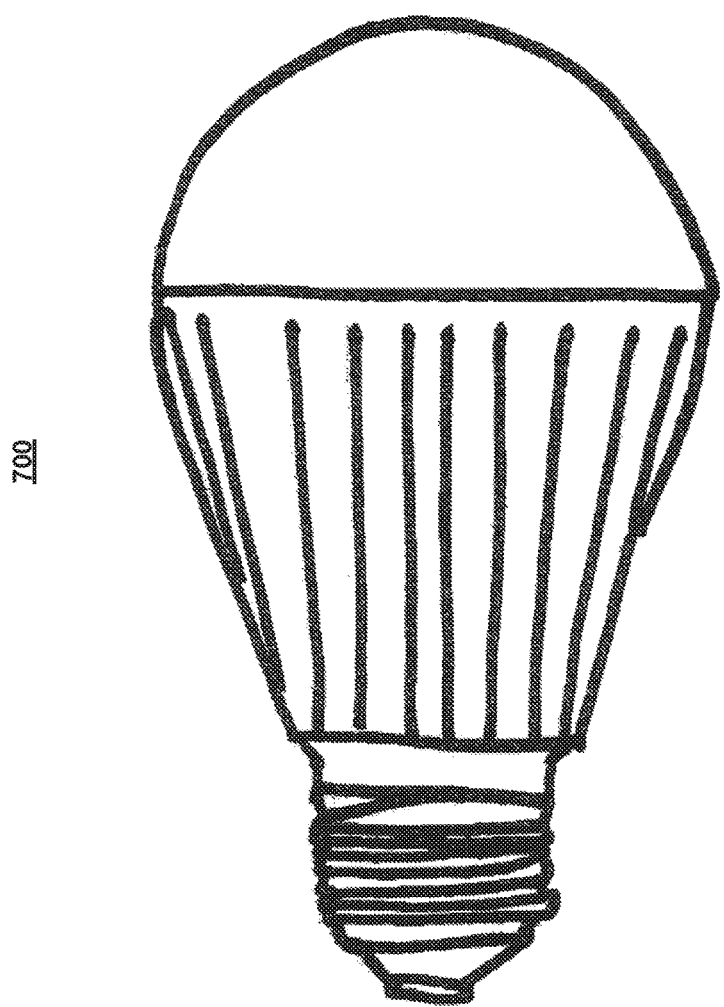
FIG. 7 is a diagram illustrating an example form factor in which the circuits described with reference to FIGS. 1A-6 can be housed.

The circuits 100, 130, 160 can be implemented in various form factors, including: a light bulb 700 as illustrated in FIG. 7, a light fixture, a standalone circuit, a printed circuit board (PCB), etc.

FIG. 1D is 1C is a diagram of an example circuit 190 that can be used to drive a fan F1. similar to the circuit 100 of FIG. 1A. The circuit 190 is shown to include many of the same components as the circuit 100, each of which functions in the same way as in the circuit 100. Instead of capacitor C1, circuit 160 shows four capacitors, C11, C12, C13, C14 arranged in parallel. The four capacitors C11, C12, C13, C14 spread the current flow among them, rather than all power flowing through a single capacitor. Also, instead of LEDs, the circuit 190 is configured to drive the fan F1 as a load. In some implementations, the fan is a 12V fan, the capacitor C2 is a 100 pF electrolytic capacitor rated at 16V, and each of the capacitors C11, C12, C13, C14 can be a 1 pF capacitor rated at 400V. In this configuration, the power consumed by the circuit 190 may be limited to about 3 W when coupled to a typical 110V-120V AC supply.

In each of FIGS. 1A-1D, variations may be made. For example, instead of the loads shown, one set of series-connected LEDs, or multiple sets of series-connected LEDs can be connected in parallel, can be connected as a load. The circuits 100, 130, 160 may thus include one, two, three, or more sets of one or more LEDs, where each set is connected to the DC terminals of the rectifier 106 in parallel to the other sets of LEDs. Other loads, including motors, fans, fuel cells, and other devices, may be used as loads in addition or as an alternative.

In some implementations, the circuits 100, 130, 160, 190 may include only the elements shown and described as being included, while excluding other elements such as, e.g., resistors. For example, resistors may be omitted from the path between the DC nodes 105, 107 of the rectifier 106 and the LEDs D18 to Dn. Similarly, resistors may be omitted from the entire DC portion of the circuit, from the entire AC portion of the circuit, or may be omitted from both the AC and DC portions of the circuits. In some implementations, each of the circuits 100, 130, 160 is able to regulate power to the LEDs to without components such as specialized semiconductor driver chips, fly-back converters, constant current drivers, voltage regulators, operational amplifiers (op amps), transistors, power transistors, and other types of components that would add cost, complexity, and additional potential failure modes to the circuit.

In some implementations, the circuits 100, 130, 160, 190 can be combined with other circuits or circuit components, including: voltage regulators, operational amplifiers (op amps), transistors, etc. to produce different form factors with different functions. As discussed below, one or more resistors may be used in some implementations, in an AC portion of a circuit, a DC portion of a circuit, or both AC and DC portions of a circuit. Similarly, where a single capacitor is shown in FIGS. 1A-1D, multiple capacitors may be used, connected together in series and/or in parallel to achieve a desired capacitance value, or to provide other circuit characteristics.

Figure 2A:
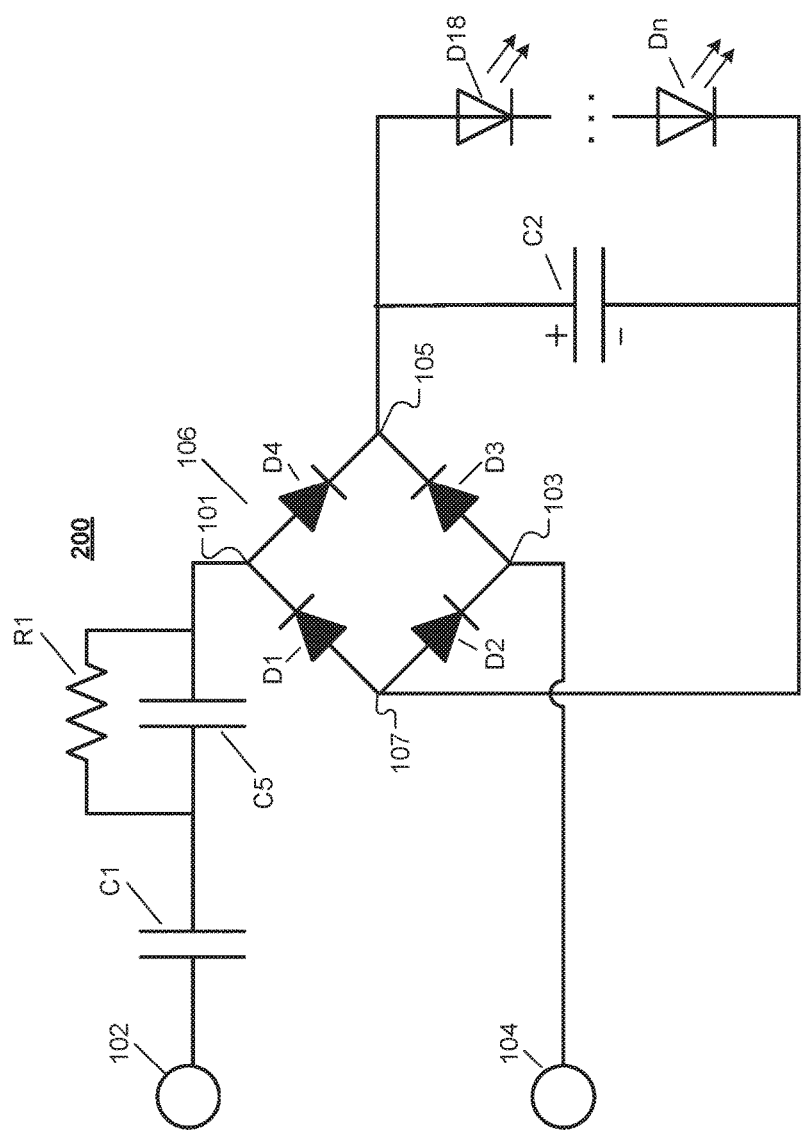
FIGS. 2A-2C are diagrams of example circuits that can efficiently drive loads.

FIG. 2A is a diagram of an example circuit 200, similar to the circuit 160 of FIG. 1C, that can efficiently drive loads. In this example, the circuit 200 can efficiently power LEDs. The circuit 200 includes a live terminal 102 and a neutral terminal 104 to couple with an alternating current (AC) power source, LEDs D18-Dn, a full-bridge rectifier 106, a resistor R1, capacitors C1 and C5 which provide impedance to AC entering the circuit 200, and a capacitor C2 in parallel the LEDs.

The circuit 200 includes a resistor R1 that gradually discharges charge, reducing the risk of electrical shock to a user. The resistor R1 can be placed in parallel with either of the capacitors C1 or C5, or both, and acts as a drain for the capacitors. For example, if the circuit 200 has a removable form factor, e.g. a light bulb, there could be a risk that a user may receive shock when removing the light bulb from a light fixture while the capacitors C1 or C5 are charged. By draining the charge from one or both of the capacitors C1 or C5 the resistor R1 can reduce the risk of an electrical shock.

Figure 2B:
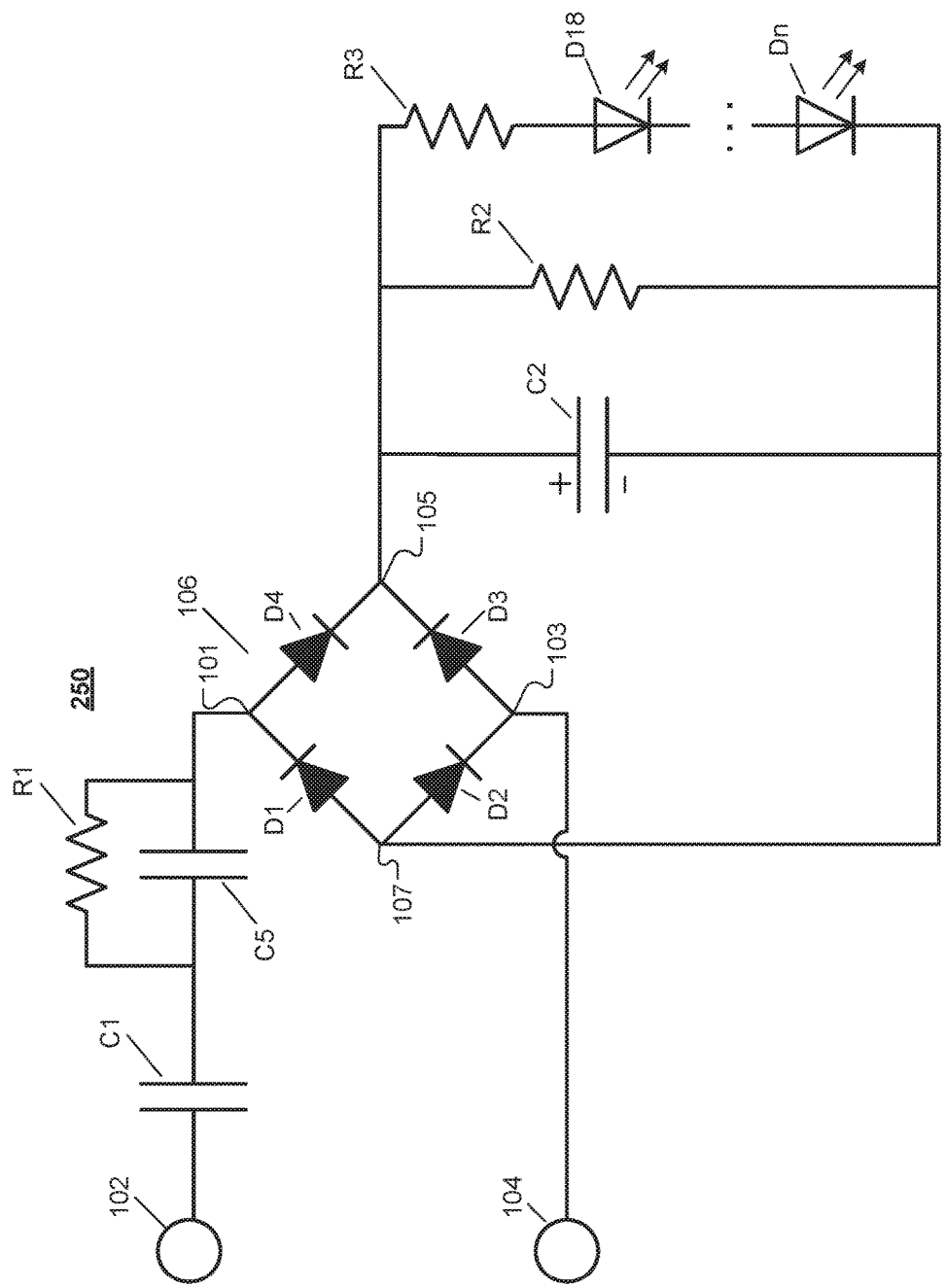

FIG. 2B is a diagram of an example circuit 250 similar to circuit 200. The circuit 250 further includes resistors R2 and R3. The resistor R3 is placed in series with the LEDs, D18-Dn. The resistor R3 limits the effect of DC voltage increases, e.g., due to spikes or surges in the AC supply, that would cause increased current through the LEDs. As the DC voltage and current through the LEDs increase, the increased current causes a greater voltage drop across the resistor R3, helping to limit the amount of current passed through the LEDs. Even with the resistor R3, the LEDs are selected to also provide robustness against voltage surges, for example, by including a series-connected set of LEDs that operates significantly below full rated output at peak DC output of the rectifier 106. Thus, in some implementations, the resistor R3 does not act to provide the primary power limitation or bias regulation for the circuit 106.

The resistor R2 is connected in parallel with the series connected LEDs and resistor R3. The resistor R2 pulls down the voltage of the circuit 250 and allows the circuit 250 to turn off more quickly than if no resistor were used. The resistor R2 acts as a pull-down resistor, keeping the voltage of the circuit 250 lower. For example, if a switch connected to the circuit 250 is flipped, the RC time constant of the resistor R2 and the capacitor C2 may be small enough to discharge the capacitor C2 quickly and reduce the delay in turning off the LEDs.

When arranged in parallel with the capacitor C2, the resistor R2 also lessens the effect of voltage surges on the circuit 250. The resistor R2 can reduce the risk of damage to the LEDs or other components of the circuit 250 by providing an alternate path for current and limiting current increases through the LEDs when a high transient voltage forced applied the circuit 250. The resistor R3 is connected in series with the series connected LEDs and reduces the effect of voltage surges on the LEDs as well, as discussed above.

Figure 2C:
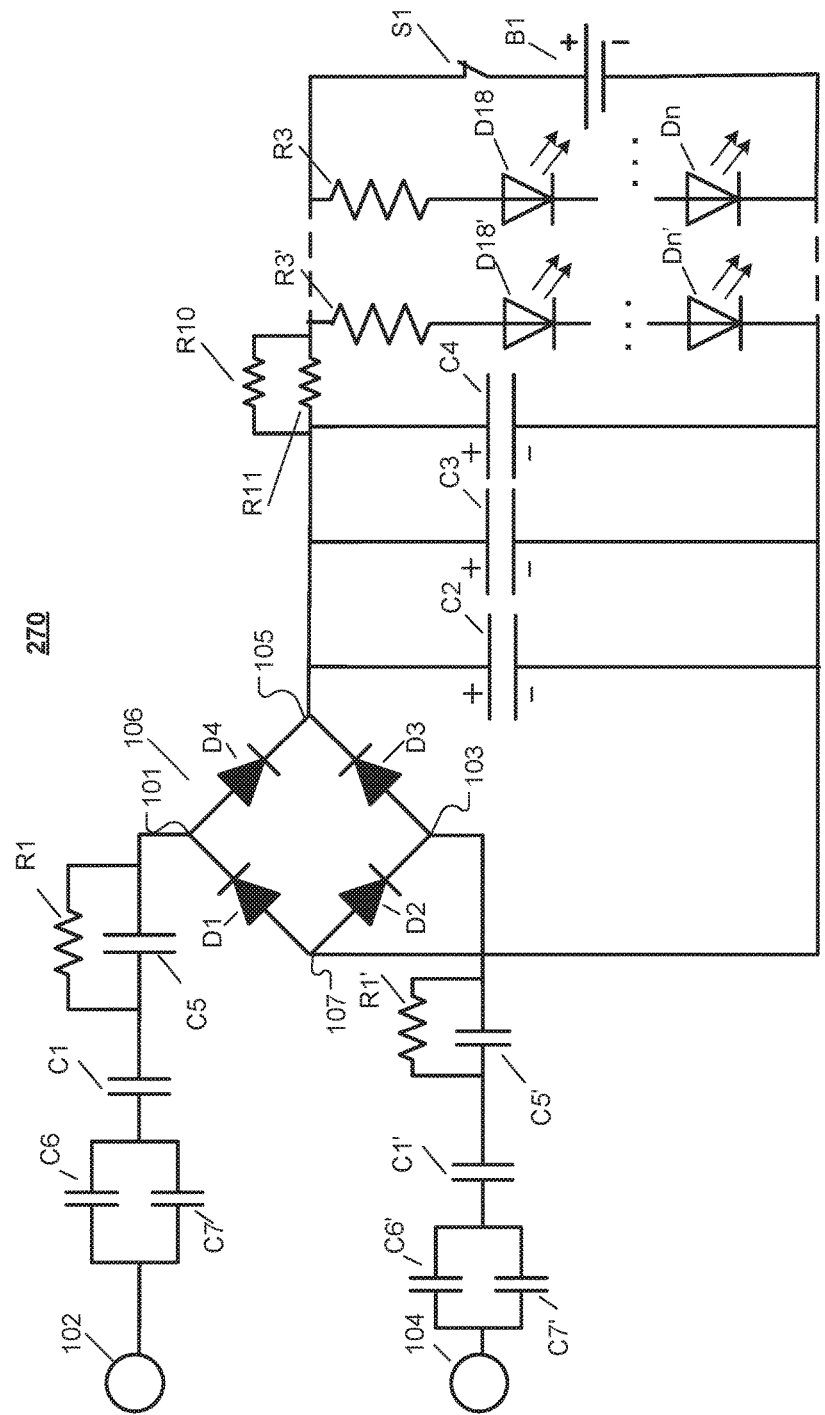

FIG. 2C is a diagram of an example circuit 270 that combines features of the circuits shown in FIGS. 1A-2B. The circuit 270 includes the rectifier 106. Between the terminal 102 and the node 101, the circuit 270 includes capacitors C1, C5, C6, C7, as well as resistor R1. The capacitors C6 and C7 represents multiple capacitors in parallel to reduce wear and spread heat generation among multiple devices, with the other components functioning as discussed above. Also as discussed above, the capacitors may have different voltage ratings to slow or otherwise control the transient response of the circuit 270. A similar set of components, e.g., capacitors C1', C5', C6', C7', and resistor R1' are connected between the terminal 104 and the node 103.

At the DC outputs of the rectifier 106, the circuit 270 includes multiple capacitors in parallel, e.g., capacitors C2, C3, and C4, which filter the DC power, spread heat generation in the circuit, and perform other functions as discussed above. The circuit 270 can also include one or more resistors in parallel with the capacitors C2 and C3, e.g., resistor R2 to regulate shut off time of the circuit and provide robustness against voltage surges. One or more resistors, e.g., resistors R10 and R11, may also be included, in parallel to each other but in series with loads on the DC output. The circuit 270 shows multiple loads, e.g., one set of LED diodes D18-Dn in series, and another set of LED diodes D18'-Dn' in series, with the loads in parallel with each other. Each load may have a separate resistor in series, e.g., R3 or R3', to limit the effect of voltage spikes on the respective loads. A battery B1, e.g., a rechargeable lithium-ion battery or other rechargeable battery, and switch S1 may be included also, allowing the circuit 270 to provide power to the LEDs or another load after AC power is interrupted. The switch S1 may be placed at the exterior housing of a light bulb or other device including the circuit 270, allowing a light bulb with the switch to be removed from a socket and used as a portable, self-contained light source.

In the example circuit 270 of FIG. 2C, the circuit may also be implemented with one or more, or all, of the resistors omitted and replaced with wires or other conductors. Similarly, loads other than LEDs may be used, and more or fewer loads may be coupled to the DC output of the rectifier 106.

Figure 3:
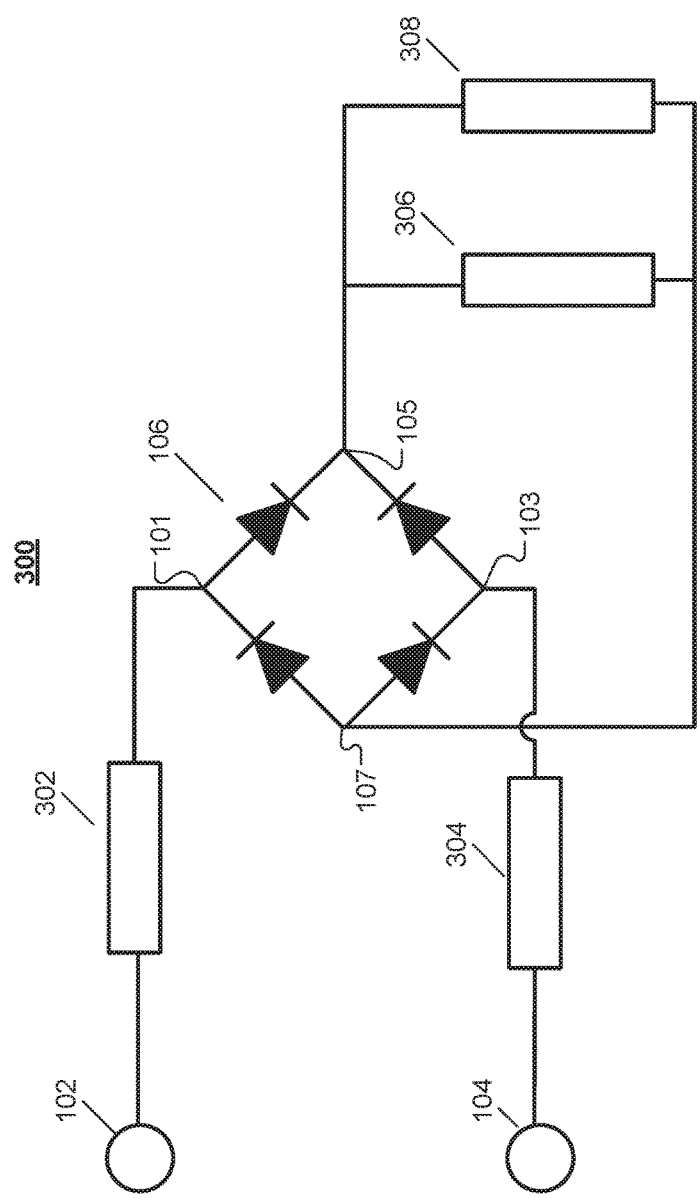
FIG. 3 is a diagram illustrating an example circuit that can efficiently drive loads.

FIG. 3 is a diagram of an example circuit 300, similar to the circuits of FIGS. 1A-2B, that can efficiently drive loads. In this example, the circuit 300 can efficiently power LEDs. The circuit 300 includes the live terminal 102 and the neutral terminal 104 to couple with the AC input. The circuit 300 includes the full-bridge rectifier 106.

The circuit 300 includes circuit elements 302, 304, 306, and 308. Each of the elements 302, 304, 306, and 308 can be various circuit components or entire circuit assemblies, including: wires, resistors, capacitors, diodes, LEDs, etc., with various values for resistance, capacitance, maximum voltage, etc. In some implementations, the elements 302, 304, 306, and 308 can each be a single component or multiple components, arranged in various ways. For example, the element 302 can represent a wire, a single capacitor, two capacitors arranged in parallel, two capacitors arranged in series, or other arrangements of components, depending on the design of the circuit. Different combinations of circuit elements and different values of the components can provide different levels of power consumption, efficiency, and longevity according to circuit requirements, as discussed below.

Examples of different arrangements of circuit 300 are shown in Table 1 below. Examples of specific components and values for each of the elements 302, 304, 306, and 308 are listed in the following table, but these details are simply examples of the broader techniques disclosed. In Table 1, each row represents a different configuration of the circuit 300. Each row has a corresponding power level that the circuit operates at. Each configuration shows examples of power levels when connected at a nominal 120V (RMS) AC supply. The power levels can represent total power draw by the entire circuit 300 in the different configurations. The actual power levels may vary depending on the nature of the components used, such as the selection of diodes used for the rectifier 106, the particular characteristics of the LEDs or other loads used in element 306, and so on. Other variations of the configurations and elements discussed below can be made, including combinations and subcombinations of elements from different rows. In some implementations, capacitors listed for element 308 are polarized, e.g., electrolytic capacitors, and capacitors in elements 302 and 304 are non-polarized capacitors.

TABLE 1

| Power Level | Element 302 | Element 304 | Element 306 | Element 308 |
|---|---|---|---|---|
| 1 W | Two capacitors, each 2.2 µF (400 V), in parallel | — | 10 W rated LED chip | Three capacitors, each 100 µF (16 V), in parallel |
| 2.3 W | Two capacitors: one 1.2 µF (250 V), one 4.7 µF (400 V), in series | — | Eighteen white LEDs in series | One capacitor, 47 µF (100 V) |
| 2.3 W | Three capacitors: two 1 µF (400 V) in parallel being arranged in series with one 4.7 µF (400 V) capacitor | — | Eighteen white LEDs in series | One capacitor, 47 µF (100 V) |
| 5 W | Two capacitors, each 2.2 µF (400 V), in parallel | — | Four 10 W rated LED chips | Two capacitors, each 270 µF (16 V), in parallel |
| 3.6 W | Two capacitors, each 4.7 µF (250 V), in parallel | — | 10 W rated chip | Three capacitors, LED each 100 µF (16 V), in parallel |
| 4.3 W | Three capacitors: one 1.2 µF (250 V) and one 1 µF (250 V) in parallel; being arranged in series with one 4.7 µF (400 V) | — | Eighteen white LEDs in series | One capacitor, 47 µF (100 V) |
| 4.3 W | Two capacitors, each 2.2 µF (400 V), in parallel | — | 30 W rated LED chip | Two capacitors, each 100 µF (16 V), in series |
| 0.5 W | One capacitor, 2 µF (400 V), one resistor 474 Ω, in parallel | One capacitor, 2.1 µF (250 V) | Eighteen LEDs, two resistors 220 Ω, in series | One capacitor, 4.7 µF (100 V) |
| 1 W | Three capacitors in series: one 1 µF (630 V), one 1.2 µF (250 V) in one 4.7 µF (400 V). A resistor 474 Ω is in parallel with the 4.7 µF capacitor | — | Two resistors 680 Ω, in parallel; in series with eighteen white LEDs in series | One capacitor, 47 µF (100 V), and one resistor 474 Ω, in series |
| 1 W | Two capacitors: one .47 µF (630 V), one 4.7 (400 V) in series | — | Eighteen white LEDS in series | One capacitor 47 µF (100 V) |
| 0.5 W | Two capacitors: one 1.2 µF (250 V) in series with one 2 µF (400 V) in parallel with one resistor 474 Ω | — | Two resistors, each 220 Ω, in parallel, in series with eighteen white LEDs in series | One capacitor 4.7 µF (100 V) |
| 0.5 W | Two capacitors: one 1 µF (400 V) in series with one 1.7 µF (400 V); with one resistor 474 Ω in parallel with the 1.7 µF capacitor | — | Nine white LEDs in series | One capacitor 47 µF (100 V), one resistor 474 Ω, in parallel |
| 0.8 W | One capacitor 4.7 µF (400 V), one resistor 474 Ω in parallel | One capacitor 0.47 µF (630 V) | Two resistors, each 680 Ω, in parallel with each other, in eighteen white LEDs in series | One capacitor 47 µF (100 V), one resistor 474 Ω, in parallel |
| 1.2 W | Two capacitors: one 1 µF (400 V), in one 1.7 µF (400 V), in parallel | — | Nine white LEDs in series | One capacitor 0.47 µF (50 V) |
| 1.8 W | Two 1 µF (400 V) capacitors in parallel; the two capacitors being arranged in series with one 4.7 µF (400 V) that is in parallel with one resistor 474 Ω | — | Two resistors, each 680 Ω, in parallel, in series with eighteen white LEDs | One capacitor 47 µF (100 V), one resistor 474 Ω, in parallel |
| 1.8 W | One capacitor 4.7 µF (250 V) | — | 10 W rated LED chips | Three capacitor each 100 µF (16 V) |

In each of the configurations shown in Table 1, and in each of the circuits shown in FIGS. 1A-2C, loads other than LEDs can be used. For example a motor, a fuel cell, or another load may be used in addition to or in place of the LEDs. Fuses switches, or other elements may be included.

The circuits shown in FIGS. 1A-1C, 2A-2C, and 3 can be implemented in various form factors, including: a light bulb 700 as illustrated in FIG. 7, a light fixture, a standalone circuit, a printed circuit board (PCB), etc.

Some implementations include a method of operation of a driver circuit. For example, a method can include receiving alternating current (AC) power in a driver circuit. The method can include providing the AC power to a full bridge rectifier through one or more capacitors coupled in series between the AC power source and the full bridge rectifier to limit an amount of power drawn by the driver circuit. The method can include performing full wave rectification of the AC power using the full bridge rectifier. The method can include applying the rectified output of the full bridge rectifier across a load coupled to the driver circuit.

The method can include other features as discussed above and illustrated for the circuits in FIGS. 1A-3. For example, applying the rectified output across the load can include applying the rectified output across a load that includes a light emitting diode (LED), a motor, or a hydrogen fuel cell. The method can include filtering the output of the full bridge rectifier using one or more capacitors coupled between positive and negative outputs of the full bridge rectifier. Providing the AC power to the full bridge rectifier through one or more capacitors can include providing the AC power to the full bridge rectifier through at least two capacitors to spread heat generation through the driver circuit, each of the at least two capacitors being coupled in series between the AC power source and the full bridge rectifier, and each of the least two capacitors being coupled in parallel with each other. The method can include gradually discharging at least a first capacitor of the one or more capacitors with a resistor providing a discharge path across the first capacitor to limit a risk of shock to a user handling the driver circuit. The method can include providing a soft start response to the application of the AC power in the response of two capacitors arranged in series between the AC power source and the full bridge rectifier, the two capacitors having different voltage ratings. Other methods, including methods of creating or providing circuits as discussed herein are also within the scope of this disclosure.

Figure 4A:
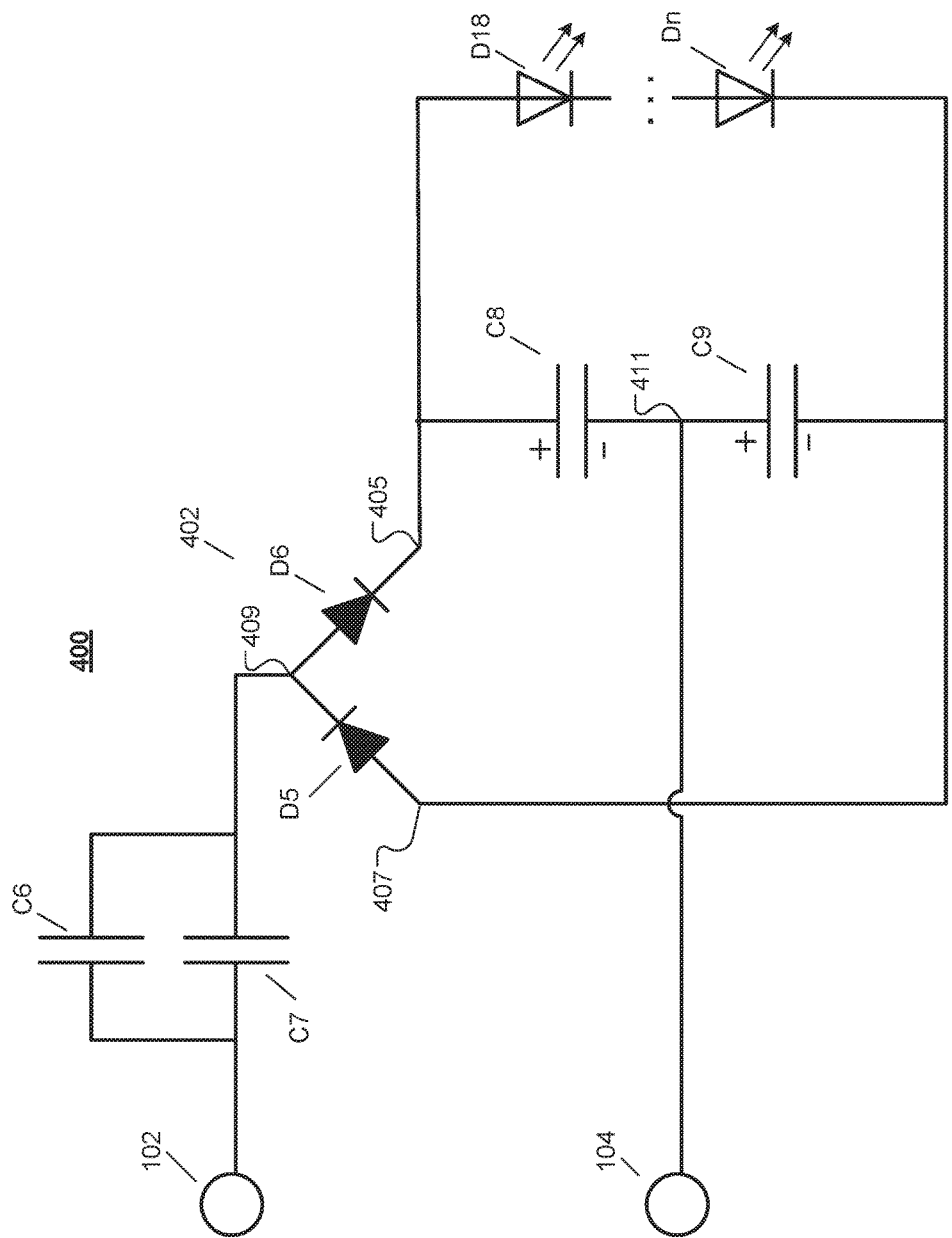
FIGS. 4A-4C are diagrams of example circuits including half-bridge rectifiers that can efficiently power LEDs.

FIG. 4A is a diagram of an example LED circuit 400 that can efficiently power LEDs. The circuit 400 includes live and neutral terminals of an alternating current (AC) power source, diodes, a rectifier, and capacitors which provide impedance and assist in regulating power to the LEDs.

The circuit 400 includes a live terminal 102 and a neutral terminal 104 to couple with an AC power source. The circuit 400 includes a rectifier 402 that includes diodes D5 and D6. The rectifier 402 can include only two diodes, and not the four diodes included in a typical full-bridge rectifier. As used herein, this will be referred to as a "half-bridge" rectifier, since it includes half of a full-bridge rectifier. Nevertheless, the half-bridge configuration of diode can be used to provide full wave rectification, e.g., DC power output for each half cycle of the AC input. The circuit 400 further includes capacitors C6, C7, C8, and C9, arranged in various ways.

The arrangement of the capacitors C8 and C9 and the neutral terminal 104 facilitates the operation of the half-bridge rectifier 402 in providing DC power to the LEDs, D18-Dn. The capacitors C8 and C9 are connected in series between the DC output nodes 405 and 407 of the half-bridge rectifier 402. The LEDs, D18-Dn, are also connected between the between the DC output nodes 405 and 407 of the half-bridge rectifier 402, with the series-connected LEDs in parallel with the series-connected capacitors C8 and C9. In some implementations, an additional capacitor may be coupled between nodes 405 and 407 to filter DC output of across the load, e.g., the LEDs. The neutral terminal 104 that couples with the AC power source is connected at a node 411 between the two capacitors C8 and C9.

With the AC terminals 102 and 104 connected as shown in FIG. 4A, the rectifier 402 and the capacitors C8 and C9 can together provide full wave rectification. Further, this rectification can be provided without inductors or transformers, either of which can be large and expensive. Further, only two diodes, e.g., D5 and D6, other than the LEDs are needed to perform the rectification. As an example, during one half of an AC cycle, the diode D6 can be forward biased to provide DC power to the LEDs and charges the capacitors C8 and C9. During the other half of the AC cycle, power may be discharged from the capacitors C8 and C9, and diode D5 may be forward biased. In this manner, the circuit 400 can provide full wave rectification with only half of a typical four-diode full bridge rectifier. Full wave rectification can be performed using only the diode elements shown, without using additional diodes or semiconductor devices, and without transformers or inductors. In some implementations, the arrangement of the rectifier and capacitors reduces the DC voltage, compared to the DC output of a full-bridge rectifier, which can be desirable since fewer LED elements may be needed to provide an appropriate load. In some implementations, the capacitors C8 and C9 have equal capacitance values, which helps balance current flows and voltage levels. In some implementations, the capacitors C8 and C9 are polarized capacitors.

The circuit 400 includes the capacitors C6 and C7, arranged in parallel, connected in series between the live terminal 102 and the half-bridge rectifier 402. The capacitors C6 and C7 are connected to the half-bridge rectifier 402 at the node 409 between the diodes D5 and D6. The capacitors C6 and C7 help regulate voltage in the circuit 400, reducing the amount of AC power to components of the circuit 400. The arrangement of the capacitors C6 and C7 in parallel reduce the overall impedance of the circuit 400, and spreads heat generation among the two capacitors to increase reliability and lifespan of the capacitors.

Figure 4B:
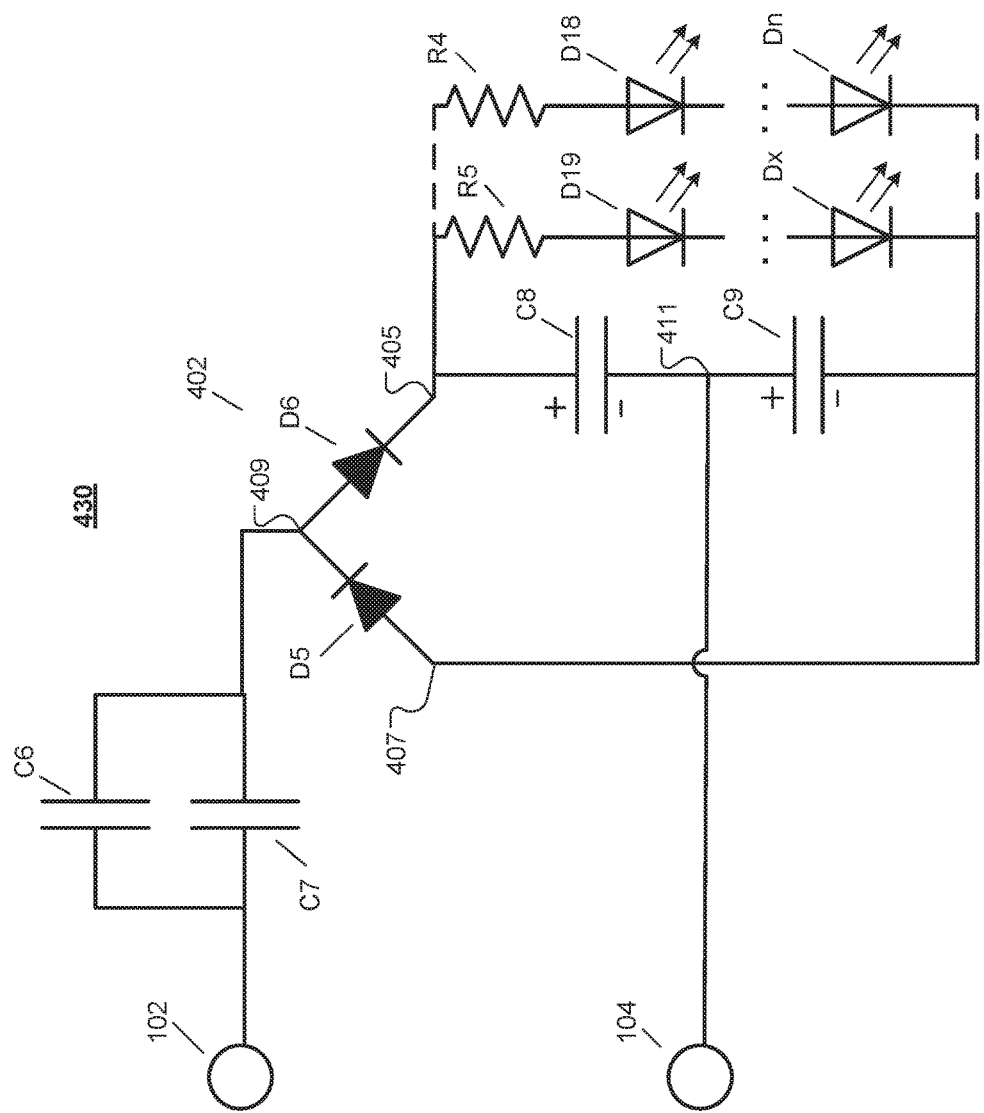

FIG. 4B is a diagram of an example LED circuit 430 similar to the circuit 400. The circuit 430 includes two sets of series-connected LEDs, and the two sets of LEDs are connected in parallel to each other. A first set of one or more LEDs, D19 through Dx, is arranged in parallel with the capacitors C8 and C9. A second set of one or more LEDs, D18 through Dn, is also arranged in parallel with the capacitors C8 and C9. Additional sets of series-connected LEDs can also be included. In some implementations, the same number and type of LEDs are used in each set, to balance the load for each set of LEDs.

The circuit 430 also includes resistors R4 and R5 arranged in series with the LEDs D18 through Dn and the LEDs D19 through Dx, respectively. The arrangement of the LEDs D19 through Dx in parallel spreads heat generation among the diodes to increase reliability and lifespan of the diodes in the circuit 430. The resistors R4 and R5 each provide protection from power surges in the circuit 430 by providing a voltage drop that increases with increasing current, thus reducing the amount of power delivered to the LEDs connected in series with each resistor.

Figure 4C:
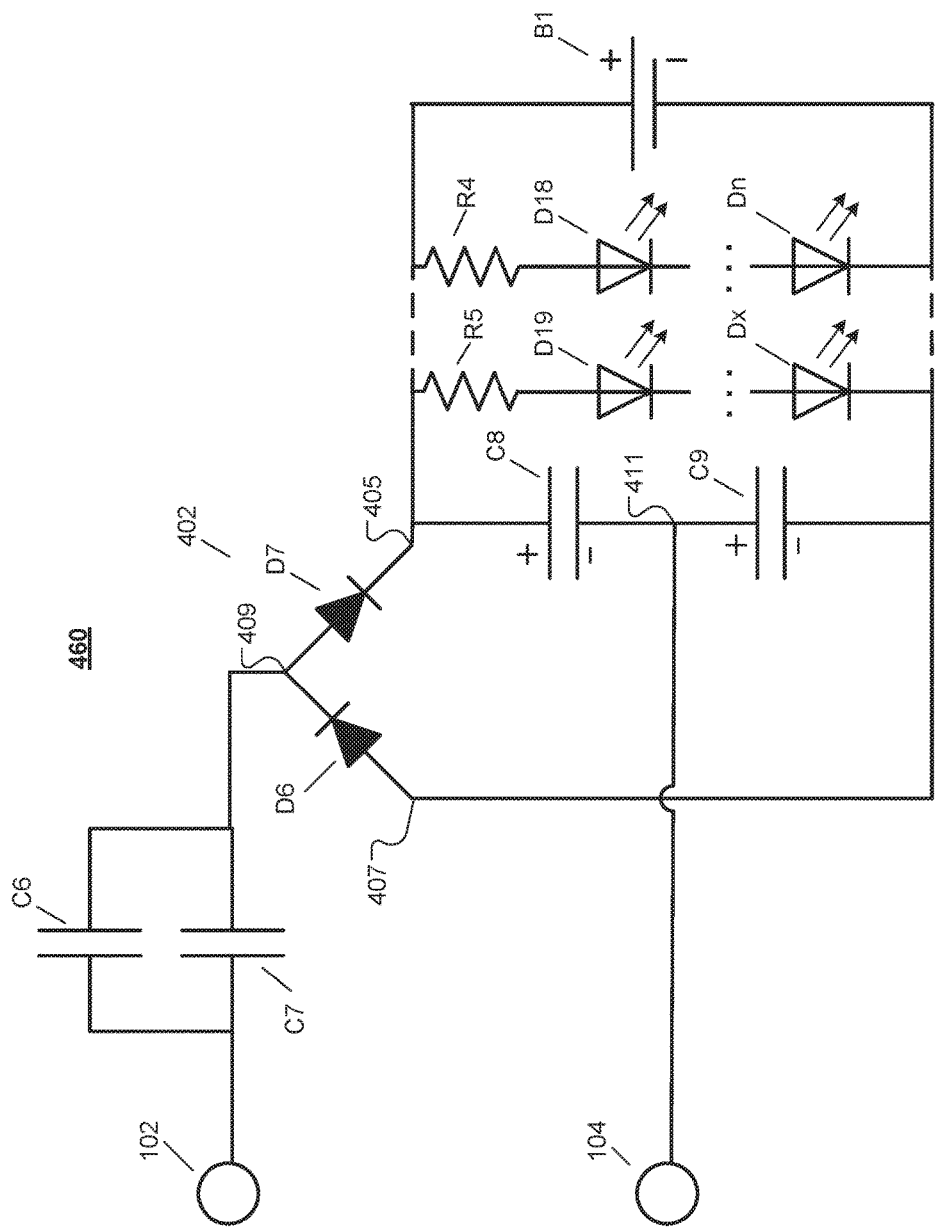

FIG. 4C is a diagram of an example LED circuit 460 similar to the circuit 430. The example circuit 460 includes a DC power source 462, such as a rechargeable battery. The DC power source 462 provides DC power to the LEDs D18 through Dn and D19 through Dx. The circuit 460 may charge the DC power source 462 without damaging the DC power source 462. In some examples, the DC power source 462 may power the circuit 460 when the circuit 460 loses its main source of AC power. For example, the DC power source 462 may be a battery that powers the circuit 460 in the form of a light bulb when a power loss occurs. In some implementations the battery is a rechargeable battery, such as a lithium-ion battery or a nickel-metal hydride battery. The battery can be housed within the light bulb housing, so that the circuit 460, the light bulb housing, and the battery are included in an integrated unit. When the light bulb is removed, it may be used as a portable source of light.

In some implementations, the circuit 460 includes a switch in series with the DC power source. By changing the position of the switch, a user can complete or break the portion of the circuit connecting the DC power source 462 with the LEDs and the rest of the circuit 460. For example, when a battery is charged, a user may use the switch to turn on or off the LEDs when the light bulb is removed from AC power. Similarly, the user may use the switch to set whether the battery should be charged or not when connected to AC power, or whether the LEDs should remain lit after AC power is disconnected.

In each of FIGS. 4A-4C, variations may be made. For example, instead of one set of series-connected LEDs, multiple sets of series-connected LEDs can be connected in parallel. The circuits 400, 430, and 460 may thus include one, two, three, or more sets of one or more LEDs, where each set is connected across the capacitors C8 and C9 in parallel to the other sets of LEDs. An additional capacitor may be included to filter the rectified DC output. For example, a capacitor, or multiple capacitors in parallel, may be coupled across the series-connected capacitors C8 and C9. Similarly, one or more resistors may be included across the series-connected capacitors C8 and C9.

In some implementations, the circuits 400, 430, 460 may include only the elements shown and described as being included, while excluding other elements such as, e.g., resistors. For example, resistors may be omitted from the path of the LEDs D18 to Dn and D19 to Dx. As an alternative, resistors may be added to the path of the LEDs D18 to Dn and D19 to Dx. In some examples, resistors may be connected in series with the live terminal 102 or the neutral terminal 104, for example, to provide a discharge path across a capacitor in series with the terminal 102 or 104. In some examples, resistors may be connected in series with the DC power source 462. Similarly, where a single capacitor is shown in FIGS. 4A-4C, multiple capacitors may be used, connected together in series and/or in parallel to achieve a desired capacitance value, or to provide other circuit characteristics.

Figure 5:
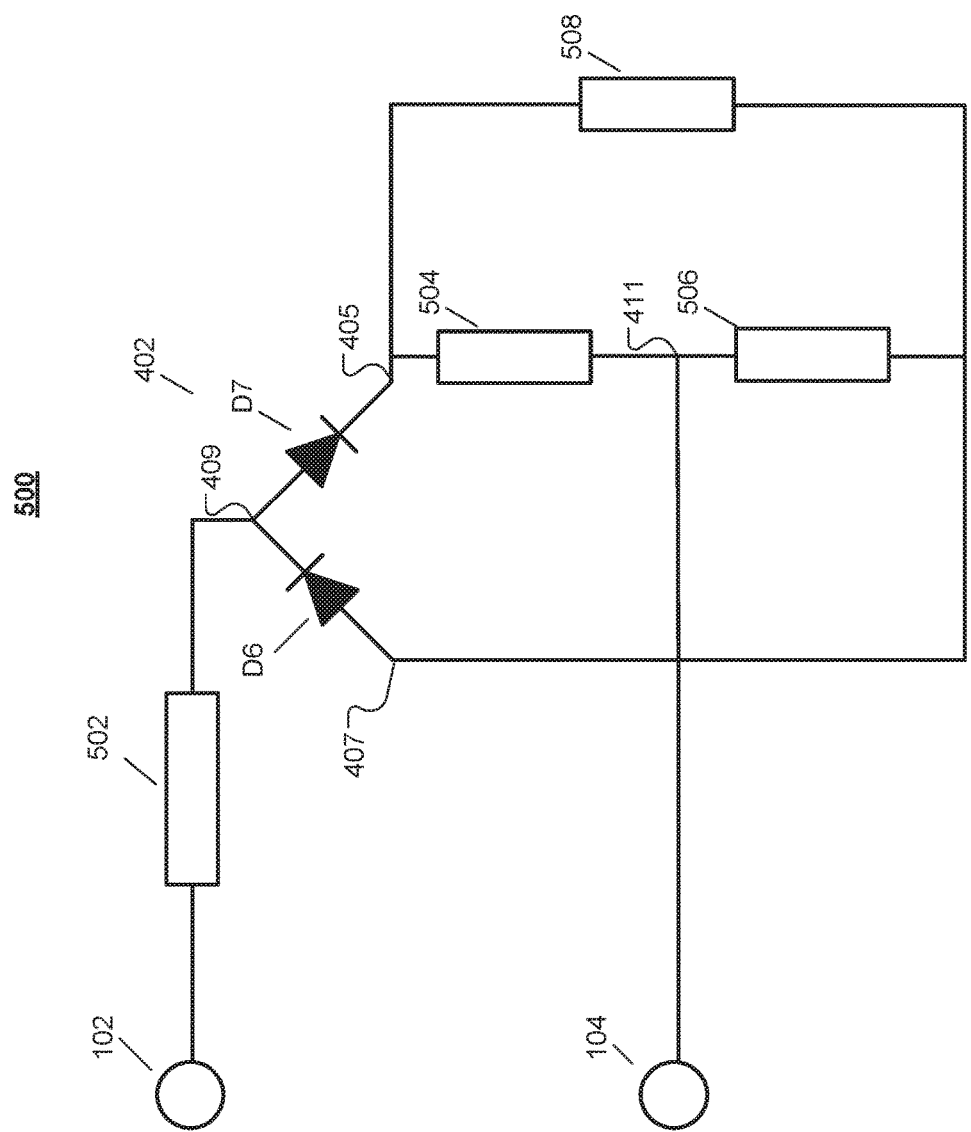
FIG. 5 is a diagram illustrating an example circuit including a half-bridge rectifier that can efficiently power LEDs.

FIG. 5 is a diagram of an example LED circuit 500, similar to the circuits of FIGS. 4A-C, that can efficiently power LEDs. The circuit 500 includes the live terminal 102 and the neutral terminal 104 to couple with the AC input. The circuit 500 includes the half-bridge rectifier 402.

The circuit 500 includes circuit elements 502, 504, 506, and 508. Each of the elements 502, 504, 506, and 508 can be various circuit components or entire circuit assemblies, including: wires, resistors, capacitors, diodes, LEDs, etc., with various values for resistance, capacitance, maximum voltage, etc. In some implementations, the elements 502, 504, 506, and 508 can each be a single component or multiple components, arranged in various ways. For example, the element 502 can represent a wire, a single capacitor, two capacitors arranged in parallel, two capacitors arranged in series, or other arrangements of components, depending on the design of the circuit. Different combinations of circuit elements and different values of the components can provide different levels of power consumption, efficiency, and longevity according to circuit requirements, as discussed below.

Examples of different arrangements of circuit 500 are shown in Table 2 below. Examples of specific components and values for each of the elements 502, 504, 506, and 508 are listed in the following table, but these details are simply examples of the broader techniques disclosed. In Table 2, each row represents a different configuration of the circuit 500. Each row has a corresponding power level that the circuit operates at. Each configuration shows power levels when connected at a nominal 120V (RMS) AC supply. Other variations of the configurations and elements discussed below can be made, including combinations and subcombinations of elements from different rows. In some implementations, the capacitors listed for elements 504 and 506 are polarized, e.g., electrolytic capacitors, and capacitors in element 502 are non-polarized capacitors.

TABLE 2

| Power Level | Element 502 | Element 504 | Element 506 | Element 508 |
|---|---|---|---|---|
| 1 W | Two capacitors, each 2.2 µF (400 V), in parallel | One capacitor 270 µF (16 V) | One capacitor 270 µF (16 V) | Two 10 W rated LED chips in series |
| 1.5 W | Three capacitors, each 2.2 µF (400 V), in parallel | One capacitor 270 µF (16 V) | One capacitor 270 µF (16 V) | Ten parallel sets of three .5 W (12 V) rated LEDs in series with one resistor 390 Ω |
| 1.5 W | Three capacitors, each 2.2 µF (400 V), in parallel | One capacitor 270 µF (16 V) | One capacitor 270 µF (16 V) | Ten parallel sets of three .5 W (12 V) rated LEDs, with each set in series with one resistor 390 Ω; in parallel with one 9 V-12 V DC power source, e.g., a rechargeable battery |
| 1.9 W | Two capacitors, each 2.2 µF (400 V), in parallel | One capacitor 270 µF (16 V) | One capacitor 270 µF (16 V) | 30 W rated LED chip |
| .3 W | Four capacitors, each 1 µF (400 V), in parallel | One capacitor 100 µF (16 V) | One capacitor 100 µF (16 V) | 3 W rated LED chip |
| .4 W | Four capacitors, each 1 µF (400 V), in parallel | One capacitor 100 µF (16 V) | One capacitor 100 µF (16 V) | Two 3W rated LED chips in parallel |

Various implementations may include variations of the circuits shown and discuss in FIGS. 4A-5.

Some implementations include a method of operation of a driver circuit. For example, a method can include receiving alternating current input in a driver circuit coupled to one or more light emitting diode elements; performing full-wave rectification of the alternating current input by the driver circuit without using a transformer, inductors, or a full bridge rectifier, the driver circuit using capacitors, two diodes, and the one or more light emitting diode elements to perform the full-wave rectification; and applying the full-wave rectified output across the one or more light emitting diode elements. In some implementations, full-wave rectification may be performed using the two diodes and the one or more light emitting diodes, without using any other diodes or other semiconductor devices.

The method can include other features as discussed above and illustrated for the circuits in FIGS. 1A-3 and FIGS. 4A-5. For example, the method may include providing the AC input to a node between the two diodes through one or more capacitors coupled in series between the source of the AC input and the node to limit an amount of power drawn by the driver circuit. Applying the full-wave rectified output across the one or more light emitting diode elements may include applying the full-wave rectified output across multiple sets of series-connected light emitting diode elements, the multiple sets of series-connected light emitting diode elements being arranged in parallel with each other. Receiving the AC input may include: receiving the AC input with a first line of the AC input coupled to a node between the two diodes, the two diodes being coupled in series; and receiving the AC input with a second line of the AC input coupled to a node between two series-connected capacitors, the series-connected capacitors being coupled in parallel with the two diodes. The method can include filtering the rectified output of the full bridge rectifier using one or more capacitors coupled in parallel across the one or more light emitting diode elements. Providing the AC power through one or more capacitors may include providing the AC power through at least two capacitors to spread heat generation through the driver circuit, each of the at least two capacitors being coupled in series between the AC power source and the node between the two diodes, and each of the least two capacitors being coupled in parallel with each other. The method can include gradually discharging at least a first capacitor through which the AC power is provided with a resistor providing a discharge path across the first capacitor to limit a risk of shock to a user handling the driver circuit. The method can include providing a soft start response to the application of the AC power in the response of two capacitors arranged in series between the AC power source and (i) the node between the two diodes, or (ii) the node between the capacitors, the two capacitors having different voltage ratings. Other methods, including methods of creating or providing circuits as discussed herein are also within the scope of this disclosure.

Figure 6:
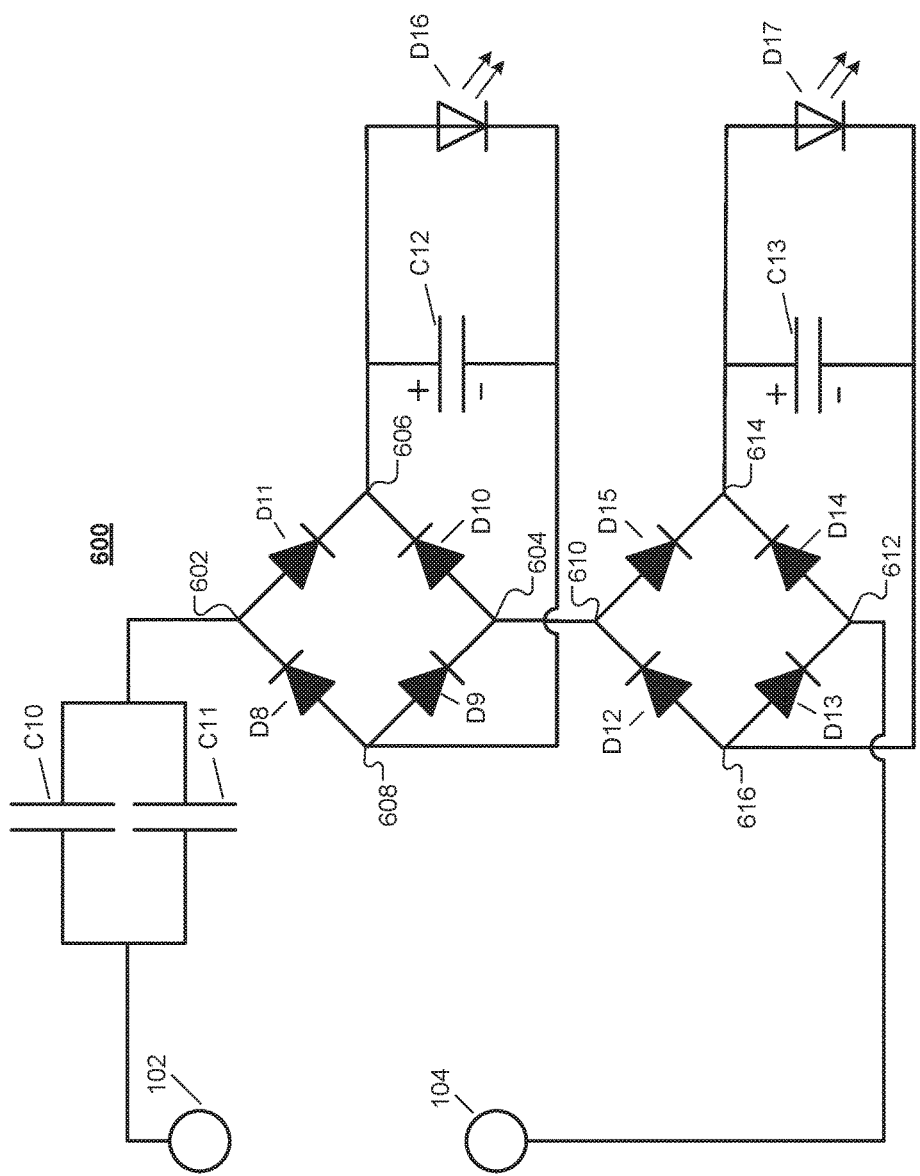
FIG. 6 is a diagram illustrating an example LED circuit including multiple full-bridge rectifiers that can efficiently drive loads.

FIG. 6 is a diagram of an example LED circuit 600 that utilizes capacitors to efficiently drive a load. The example circuit 600 includes live and neutral terminals to couple with an alternating current (AC) power source, diodes, two full-bridge rectifiers, and capacitors which provide AC resistance and voltage biasing for the LEDs.

The circuit 600 includes a live terminal 102 and a neutral terminal 104 to couple with an AC power source. The circuit 600 includes capacitors C10 and C11 arranged in parallel. The capacitors C10 and C11 act to limit the amount of power flowing into the components of the circuit 600 as capacitance builds up. The arrangement of the capacitors C10 and C11 in parallel reduces the overall impedance of the circuit 600, and thus the heat generated in the circuit 600. The capacitors C10 and C11 can have various capacitance values and voltage ratings, including: 1 pF/400 V, 2.2 pF/400 V, 1.2 pF/400 V, etc. In some implementations, the capacitors C10 and C11 have the same capacitance values and maximum voltage ratings. In other implementations, the capacitors C10 and C11 have different capacitance values and maximum voltage ratings.

The circuit 600 includes two full-bridge rectifiers 602 and 604 connected in series. The full-bridge rectifier 602 includes diodes D8, D9, D10, and D11. Node 602 between the diodes D8 and D11 and node 604 between the diodes D9 and D10 are AC terminals of the full-bridge rectifier 602. Node 606 between the diodes D8 and D9 and node 608 between the diodes D10 and D11 are DC terminals of the full-bridge rectifier 602. The full-bridge rectifier 604 includes D12, D13, D14, and D15. Node 610 between the diodes D12 and D15 and node 612 between the diodes D13 and D14 are AC terminals of the full-bridge rectifier 604. Node 614 between the diodes D8 and D9 and node 616 between the diodes D10 and D11 are DC terminals of the full-bridge rectifier 604.

The capacitors C10 and C11 are connected in series between the live terminal 102 and an AC terminal of the full-bridge rectifier 602. The full-bridge rectifier 602 is connected, at the other AC terminal of the full-bridge rectifier 602, to the full-bridge rectifier 604, at an AC terminal of the full-bridge rectifier 604. The full-bridge rectifier 604 is connected, at the other AC terminal of the full-bridge rectifier 604, to the neutral terminal 104.

Two full-bridge rectifiers produce a lower output voltage by providing two forward voltage drops, one over each of the full-bridge rectifiers 602 and 604. The lower output voltage and power delivered to the circuit 600 reduces the heat generated and extends the operating lifetime of the LEDs D16 and D17. The use of two separate full-bridge rectifiers and two separate LEDs increases lumen output, generating more light with greater efficiency.

The circuit 600 further includes capacitors C12 and C13. The capacitors C12 and C13 are connected in parallel across the DC terminals of the full-bridge rectifiers 602 and 604, respectively. The capacitors C12 and C13 act to reduce the impact of power surges across the circuit 600. The capacitors C12 and C13 smooth the voltage fluctuations at the DC terminals of the full-bridge rectifiers 602 and 604. In some implementations, the capacitors C12 and C13 are polarized capacitors. The capacitors C12 and C13 can have various capacitance values and maximum voltage ratings, including: 100 pF/16 v, 47 pF/100 V, 270 pF/16 V, etc. In some implementations, the capacitors C12 and C13 have the same capacitance values and maximum voltage ratings. In other implementations, the capacitors C12 and C13 have different capacitance values and maximum voltage ratings.

The circuit 600 includes one or more LEDs D16 and D17. The LEDs D16 and D17 are connected in parallel with the capacitors C12 and C13 across the DC terminals of the full-bridge rectifiers 602 and 603, respectively.

FIG. 7 illustrates an example form factor 700 for the circuits described with respect to FIGS. 1A-1C, 2A-6. The form factor 700 is a light bulb, and can be compatible with existing light fixtures, including: lamps, overhead fixtures, sconces, etc. Other form factors for the circuits described with respect to FIGS. 1A-6 are possible, including: PCBs, standalone circuits, a packaged circuit for use in more complex circuits, within a case or housing, etc.

A number of implementations have been described. Nevertheless, it will be understood that various modifications may be made without departing from the spirit and scope of the disclosure. For example, various operations discussed above may be used, with steps re-ordered, added, or removed.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As used herein, components that are coupled together may be electrically connected in a manner that allows electrical communication between them. Thus coupled components may be connected directly, e.g., by a wire, solder, circuit board trace, or other conductor, or indirectly through one or more other intervening circuit components.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Particular implementations of the invention have been described. Other implementations are within the scope of the following claims. For example, the steps recited in the claims can be performed in a different order and still achieve desirable results.

What is claimed is:

1. A device configured to provide direct current (DC) based on input from an alternating current (AC) power source providing AC power having a peak voltage, the device comprising:
   a first terminal to couple the AC power source providing AC power having the peak voltage;
   a second terminal to couple to the AC power source;
   a full bridge rectifier formed by four diodes arranged in a bridge circuit configuration, the full bridge rectifier being arranged to receive power from the AC source and provide rectified DC power between a positive node and a negative node without any transistors;
   a first capacitor coupled in series between the full bridge rectifier and the first terminal;
   a load coupled between the positive node and negative node;
   a second capacitor coupled between the positive node and negative node of the rectifier, in parallel with the load; and
   a third capacitor coupled in series between the full bridge rectifier and the first terminal or second terminal, wherein the first capacitor and the third capacitor have different maximum voltage ratings that are each greater than the peak voltage of the AC power source, wherein the first and third capacitors having different maximum voltage ratings provides a turn on time of the device that is greater than if the first and third capacitors were capacitors with lower maximum voltage ratings;
   wherein the device does not include any resistors in series with the load between the positive node and negative node.

2. The device of claim 1, wherein the load comprises an electric motor.

3. The device of claim 1, wherein the load comprises a fuel cell.

4. The device of claim 1, wherein the load comprises multiple light emitting diode elements coupled in series between the positive and negative outputs of the rectifier.

5. The device of claim 1, wherein the device is a removable light bulb, and wherein the device further comprises a threaded light bulb housing.

6. The device of claim 1, wherein the device includes:
   a first path, between the positive node and the negative node and through the second capacitor, that does not include any resistors; and
   a second path, between the positive node and the negative node and through the load, that does not include any resistors.

7. The device of claim 1, wherein the third capacitor is further coupled in series with the first capacitor.

8. The device of claim 1, further comprising a resistor coupled in parallel with the third capacitor.

9. The device of claim 1, wherein the device is configured to operate using a 120V AC power source,
   wherein both the first capacitor and the third capacitor have a maximum voltage rating that exceeds the peak voltage of the 120V AC power source; and
   wherein the first capacitor and the third capacitor have a difference in maximum voltage rating such that first capacitor has a maximum voltage rating at least twice the maximum voltage rating of the third capacitor.

10. The device of claim 1, further comprising one or more additional capacitors in parallel with the first capacitor.

11. The device of claim 1, further comprising one or more additional capacitors in parallel with the second capacitor.

12. The device of claim 1, wherein the device is configured to operate using an AC power source having a particular voltage,
   wherein the load is configured to operate at full rated output at a first voltage across the load, and
   wherein the first voltage is greater than a peak output voltage of the rectifier when the device is coupled to the AC power source of the particular voltage.

13. The device of claim 1, wherein the load is configured to place an electrical load on the full bridge rectifier that exceeds the DC output of the rectifier.

14. The device of claim 1, wherein the third capacitor is coupled in series between the full bridge rectifier and the first terminal and is coupled in series with the first capacitor; wherein the device further comprises: a fourth capacitor coupled in series between the full bridge rectifier and the second terminal; and a fifth capacitor coupled in series between the full bridge rectifier and the second terminal, wherein the fifth capacitor is coupled in series with the fourth capacitor.

15. The device of claim 1, wherein each of the four diodes is a discrete diode.

16. The device of claim 1, wherein the device is a light bulb comprising a light bulb housing, wherein the first terminal and the second terminal are electrical contacts at a base of the light bulb housing, wherein the full bridge rectifier, the first capacitor, the second capacitor, the third capacitor, and the load are housed within the light bulb housing.

17. A device comprising:
   a first terminal to couple to an alternating current (AC) power source;
   a second terminal to couple to the AC power source;
   a full bridge rectifier formed by four diodes arranged in a bridge circuit configuration, the full bridge rectifier being arranged to receive power from the AC source and provide rectified DC power between a positive node and a negative node;
   a first capacitor coupled in series between the full bridge rectifier and the first terminal or the second terminal;
   a load coupled between the positive node and negative node;
   a second capacitor coupled between the positive node and negative node of the full bridge rectifier, in parallel with the load;
   a battery, coupled between the positive node and the negative node, arranged to provide DC power to the load; and
   a switch coupled between the positive node and the negative node, the switch being coupled in series with the battery, the switch and battery being coupled in parallel to the load,
   wherein the device is a light bulb comprising a light bulb housing, wherein the first terminal and the second terminal are electrical contacts at a base of the light bulb housing, wherein the full bridge rectifier, the first capacitor, the second capacitor, the load, and the battery are housed within the light bulb housing.

18. The device of claim 17, wherein the full bridge rectifier is arranged to provide the rectified DC power in response to received AC power without the operation of any transistors.

19. The device of claim 17, wherein the device does not include any resistors in series with the load between the positive node and negative node.

20. The device of claim 17, wherein the light bulb housing has a threaded base.

21. The device of claim 17, wherein the switch is located at an exterior housing of the light bulb housing.

22. The device of claim 17, further comprising a third capacitor coupled in series between the full bridge rectifier and the first terminal or second terminal, wherein the first capacitor and the third capacitor have different maximum voltage ratings that are each greater than the peak voltage of the AC power source, wherein the first and third capacitors having different maximum voltage ratings provides a turn on time of the device that is greater than if the first and third capacitors were capacitors with lower maximum voltage ratings.

23. A device configured to provide direct current (DC) based on input from an alternating current (AC) power source providing AC power having a peak voltage, the device comprising:

a first terminal to couple the AC power source providing AC power having the peak voltage;
a second terminal to couple to the AC power source;
a full bridge rectifier formed by four diodes arranged in a bridge circuit configuration, the full bridge rectifier being arranged to receive power from the AC source and provide rectified DC power between a positive node and a negative node;
a first capacitor coupled in series between the full bridge rectifier and the first terminal
a load coupled between the positive node and negative node;
a second capacitor coupled between the positive node and negative node of the rectifier, in parallel with the load; and
a third capacitor coupled in series between the full bridge rectifier and the first terminal or second terminal, wherein the first capacitor and the third capacitor have different maximum voltage ratings that are each greater than the peak voltage of the AC power source,
wherein the first capacitor has a first maximum voltage rating and the third capacitor has a second maximum voltage rating, the second maximum voltage rating being greater than the first maximum voltage rating,
wherein the third capacitor having the second maximum voltage rating provides a greater turn on time of the device than if the third capacitor had the first maximum voltage rating.

* * * * *